United States Patent
Song et al.

(10) Patent No.: US 11,115,359 B2
(45) Date of Patent: Sep. 7, 2021

(54) METHOD AND APPARATUS FOR IMPORTANCE FILTERING A PLURALITY OF MESSAGES

(71) Applicant: SAMSUNG ELECTRONICS CO., LTD., Suwon-si (KR)

(72) Inventors: Hee-jun Song, Seoul (KR); Seo-young Jo, Seoul (KR); Jung-wook Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1 day.

(21) Appl. No.: 15/798,799

(22) Filed: Oct. 31, 2017

(65) Prior Publication Data

US 2018/0123993 A1     May 3, 2018

(30) Foreign Application Priority Data

Nov. 3, 2016  (KR) .................. 10-2016-0145948
Sep. 1, 2017  (KR) .................. 10-2017-0111660

(51) Int. Cl.
| G06F 15/16 | (2006.01) |
| H04L 12/58 | (2006.01) |
| G06N 20/00 | (2019.01) |
| G06N 3/08 | (2006.01) |

(52) U.S. Cl.
CPC ............ *H04L 51/12* (2013.01); *G06N 20/00* (2019.01); *H04L 51/046* (2013.01); *H04L 51/22* (2013.01); *G06N 3/084* (2013.01)

(58) Field of Classification Search
CPC ....... H04L 51/12; H04L 51/046; H04L 51/22; G06N 20/00; G06N 3/084

USPC ........................................................ 709/206
See application file for complete search history.

(56) References Cited

U.S. PATENT DOCUMENTS

| 5,691,708 | A | | 11/1997 | Batchelder et al. | |
| 5,990,890 | A | * | 11/1999 | Etheredge | ............. G06F 3/0236 348/E5.105 |
| 6,018,372 | A | * | 1/2000 | Etheredge | .......... H04N 5/44543 348/E5.105 |
| 6,172,674 | B1 | * | 1/2001 | Etheredge | ............ H04N 5/4401 348/E5.105 |
| 6,301,608 | B1 | * | 10/2001 | Rochkind | ............... H04L 51/12 379/93.24 |
| 6,778,941 | B1 | * | 8/2004 | Worrell | ................ G06Q 10/107 702/176 |

(Continued)

FOREIGN PATENT DOCUMENTS

| CN | 102648462 A | 8/2012 |
| CN | 105915440 A | 8/2016 |

(Continued)

OTHER PUBLICATIONS

Search Report and Written Opinion dated Feb. 6, 2018 in counterpart International Patent Application No. PCT/KR2017/012282.

(Continued)

*Primary Examiner* — Alicia Baturay
(74) *Attorney, Agent, or Firm* — Nixon & Vanderhye P.C.

(57) ABSTRACT

An electronic apparatus for filtering a plurality of messages, via a user interface including a filtering bar. A display is for displaying a plurality of messages, and an input is to request a filtering of the plurality of messages based on importance.

17 Claims, 21 Drawing Sheets

(56) References Cited

U.S. PATENT DOCUMENTS

| | | | |
|---|---|---|---|
| 6,807,566 B1* | 10/2004 | Bates | H04L 51/12 709/206 |
| 7,073,129 B1* | 7/2006 | Robarts | G06Q 10/10 463/36 |
| 7,752,279 B2* | 7/2010 | Hardy | G06Q 10/107 709/206 |
| 7,844,666 B2* | 11/2010 | Horvitz | G06Q 10/107 709/206 |
| 7,882,195 B2* | 2/2011 | Kirkland | H04L 51/04 709/205 |
| 8,019,834 B2* | 9/2011 | Horvitz | G05B 19/404 702/150 |
| 8,024,415 B2* | 9/2011 | Horvitz | H04L 51/12 709/207 |
| 8,095,613 B1* | 1/2012 | Perkowitz | G06Q 10/109 709/207 |
| 8,346,875 B2* | 1/2013 | Gillai | G06F 15/16 709/206 |
| 8,352,573 B2 | 1/2013 | Chandra | |
| 8,364,467 B1* | 1/2013 | Bowman | G06F 40/279 704/9 |
| 8,713,027 B2* | 4/2014 | Forutanpour | G06Q 10/107 707/748 |
| 8,977,304 B2* | 3/2015 | Ramanujam | H04L 51/26 455/466 |
| 9,009,298 B2* | 4/2015 | Besehanic | H04H 60/66 709/224 |
| 9,116,984 B2 | 8/2015 | Caldwell | |
| 9,180,882 B1 | 11/2015 | Dolgov et al. | |
| 9,219,619 B2 | 12/2015 | Mayers et al. | |
| 9,350,690 B2* | 5/2016 | Meijer | G06F 15/16 |
| 9,356,905 B2 | 5/2016 | Malik et al. | |
| 9,369,421 B2 | 6/2016 | Tardelli et al. | |
| 9,753,635 B2* | 9/2017 | Heo | H04L 51/22 |
| 10,594,646 B2* | 3/2020 | Abou Mahmoud | H04L 51/26 |
| 10,614,422 B2* | 4/2020 | Arora | H04L 51/20 |
| 10,623,361 B2* | 4/2020 | Lukas | G06F 3/0488 |
| 2002/0016787 A1 | 2/2002 | Kanno | |
| 2002/0049868 A1* | 4/2002 | Okada | G06F 16/313 719/330 |
| 2003/0195937 A1* | 10/2003 | Kircher, Jr. | H04L 67/306 709/207 |
| 2004/0030996 A1* | 2/2004 | Van Liempd | G06F 16/3332 715/273 |
| 2004/0039786 A1* | 2/2004 | Horvitz | G05B 19/404 709/207 |
| 2004/0138809 A1 | 7/2004 | Mukaiyama | |
| 2004/0143636 A1* | 7/2004 | Horvitz | H04L 29/06 709/207 |
| 2004/0177271 A1* | 9/2004 | Arnold | G06Q 10/107 713/154 |
| 2004/0205451 A1* | 10/2004 | Kowalski | G06F 17/2765 715/255 |
| 2005/0044154 A1* | 2/2005 | Kaminski | H04L 51/12 709/206 |
| 2005/0044155 A1* | 2/2005 | Kaminski | H04L 51/12 709/206 |
| 2005/0044156 A1* | 2/2005 | Kaminski | H04L 51/12 709/206 |
| 2005/0204001 A1* | 9/2005 | Stein | G06Q 10/107 709/206 |
| 2005/0240617 A1* | 10/2005 | Lund | G06Q 10/107 |
| 2006/0010217 A1* | 1/2006 | Sood | H04L 51/12 709/206 |
| 2006/0017983 A1* | 1/2006 | Syri | H04L 67/306 358/402 |
| 2006/0195379 A1* | 8/2006 | Abecassis | G06Q 30/02 705/35 |
| 2006/0206569 A1* | 9/2006 | Heidloff | H04L 51/22 709/206 |
| 2007/0106738 A1* | 5/2007 | Barnes | G06Q 10/107 709/206 |
| 2007/0156886 A1* | 7/2007 | Srivastava | G06Q 10/109 709/224 |
| 2007/0208498 A1* | 9/2007 | Barker | G08G 1/0104 701/117 |
| 2008/0005249 A1* | 1/2008 | Hart | G06Q 10/107 709/206 |
| 2008/0189633 A1* | 8/2008 | Boyle | G06Q 10/10 715/764 |
| 2008/0263478 A1* | 10/2008 | Sporkin | G06F 3/0481 715/835 |
| 2008/0270560 A1* | 10/2008 | Tysowski | H04L 51/14 709/207 |
| 2009/0013052 A1* | 1/2009 | Robarts | G06Q 10/107 709/206 |
| 2009/0222917 A1* | 9/2009 | Mills | H04L 51/12 726/22 |
| 2010/0255817 A1* | 10/2010 | Chen | G06Q 10/107 455/412.2 |
| 2011/0119258 A1* | 5/2011 | Forutanpour | G06Q 10/107 707/723 |
| 2011/0196876 A1* | 8/2011 | Seeger | G06Q 10/10 707/748 |
| 2012/0054642 A1* | 3/2012 | Balsiger | G06Q 10/107 715/752 |
| 2012/0056733 A1* | 3/2012 | Ramsay | G06F 1/1626 340/407.2 |
| 2012/0149342 A1* | 6/2012 | Cohen | H04L 51/26 455/412.2 |
| 2013/0179800 A1* | 7/2013 | Jeong | H04M 1/72552 715/752 |
| 2013/0212047 A1* | 8/2013 | Lai | G06Q 10/107 706/12 |
| 2013/0232154 A1 | 9/2013 | Hall et al. | |
| 2013/0238319 A1* | 9/2013 | Minegishi | G06F 40/20 704/9 |
| 2013/0282841 A1* | 10/2013 | Bates | H04L 51/32 709/206 |
| 2013/0288722 A1* | 10/2013 | Ramanujam | H04L 51/26 455/466 |
| 2013/0339276 A1* | 12/2013 | Lai | G06Q 10/107 706/12 |
| 2014/0201296 A1* | 7/2014 | Patfield | H04L 51/04 709/206 |
| 2014/0229555 A1* | 8/2014 | DeLuca | H04L 51/12 709/206 |
| 2014/0280616 A1* | 9/2014 | Ramanathan | G06Q 10/107 709/206 |
| 2015/0046423 A1* | 2/2015 | Weeks | G06F 16/951 707/708 |
| 2015/0178371 A1 | 6/2015 | Seth et al. | |
| 2015/0215253 A1* | 7/2015 | Vemuri | H04L 51/12 709/206 |
| 2015/0220238 A1* | 8/2015 | Heo | H04L 51/22 715/752 |
| 2015/0358267 A1 | 12/2015 | Barrera et al. | |
| 2016/0092793 A1* | 3/2016 | Garrow | G06N 20/10 706/12 |
| 2016/0142359 A1 | 5/2016 | Lock et al. | |
| 2016/0182420 A1* | 6/2016 | Shen | H04L 51/12 709/206 |
| 2016/0183068 A1* | 6/2016 | Shen | H04W 4/12 455/466 |
| 2016/0212086 A1 | 7/2016 | Mathew et al. | |
| 2016/0299954 A1 | 10/2016 | Bawri et al. | |
| 2016/0308875 A1* | 10/2016 | Judge | H04L 63/102 |
| 2017/0005973 A1* | 1/2017 | Kaminsky | H04L 51/22 |
| 2017/0078235 A1* | 3/2017 | Cannata | G06Q 10/107 |
| 2017/0221084 A1* | 8/2017 | Thirugnanasundaram | G06Q 10/107 |
| 2017/0374560 A1* | 12/2017 | Judge | H04W 12/08 |
| 2018/0165174 A1* | 6/2018 | Ajiro | G06F 11/3476 |
| 2018/0232360 A1* | 8/2018 | Asaoka | G06F 11/30 |
| 2018/0240069 A1* | 8/2018 | Yong | G06F 3/04842 |
| 2019/0102747 A1* | 4/2019 | Terra | G06N 20/00 |
| 2020/0034336 A1* | 1/2020 | Haddad | G06F 9/451 |
| 2020/0053038 A1* | 2/2020 | Kamal | H04L 51/22 |

(56) References Cited

U.S. PATENT DOCUMENTS

FOREIGN PATENT DOCUMENTS

| JP | 5728374 | 6/2015 |
|----|---------|--------|
| KR | 10-2014-0136820 | 12/2014 |
| KR | 10-1480711 | 1/2015 |

OTHER PUBLICATIONS

Extended European Search Report dated Jun. 28, 2019 for EP Application No. 17867205.1.
India Office Action dated Jan. 5, 2021 for IN Application No. 201927021683.
Chinese Office Action dated Jan. 27, 2021 for CN Application No. 201780077980.7.
European Examination Report Action dated Mar. 31, 2020 for EP Application No. 17867205.1.
Chinese Notice of Allowance dated Jul. 14, 2021 for CN Application No. 201780077980,7.

* cited by examiner

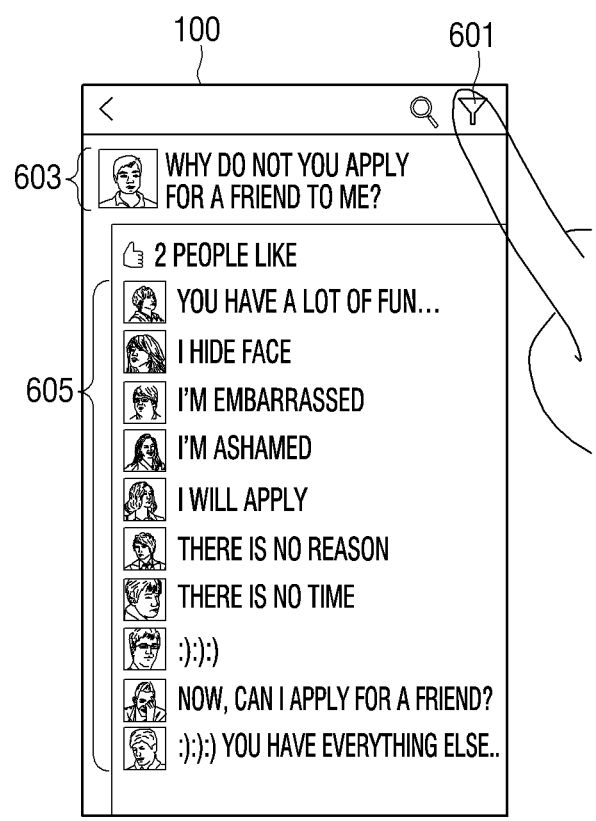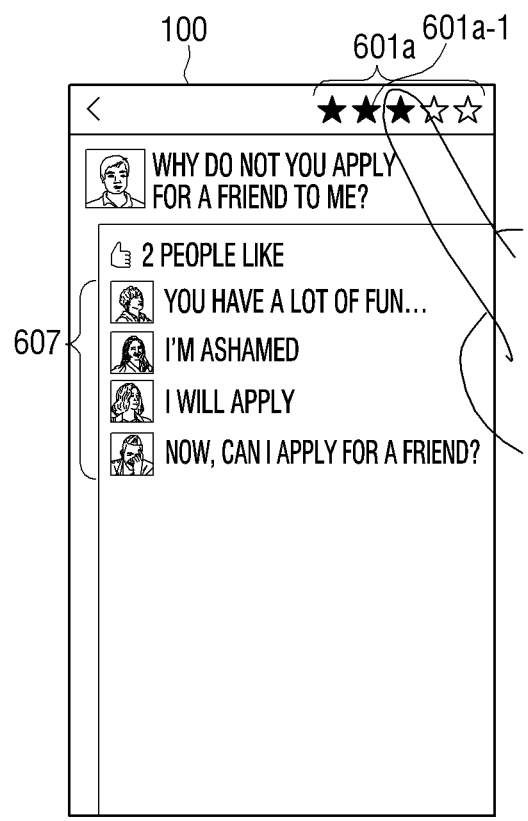

FIG. 7A

| MAIL ⚙ ← | IN BOX | | |
|---|---|---|---|
| MAIL WRITE | TOTAL 15  ALL ⌄  CATEGORY ⌄  VIEW ⌄ | | |
| MAILBOX | ☐ \| TITLE | \| SENDER | \| DATE |
| INBOX 15 | ☐ BUSINESS PLAN | KIM CHULSOO | 13:46 |
| SENT | ☐ 2016 THIRD FOREIGN LANGUAGE COURSE | XX EDUCATION INSTITUTE | 12:30 |
| DRAFT | ☐ FORUM NOTICE | HONG GILDONG | 12:27 |
| SPAM | ☐ MEETING RESULT | CHIEF KIM | 11:50 |
| DELETED | ☐ MEETING RESULT | SEO GARAM | 11:33 |
| SNOOZE | ☐ BUSINESS TRIP REPORT | SUNG JINSOO | 11:24 |
| | ☐ EXPENSE GUIDE | HWANG SOOYEON | 10:20 |
| + CREATE NEW MAILBOX | ☐ SEPTEMBER EDUCATION GUIDE | DEPUTY SECTION CHIEF NA | 09:55 |
| MAILBOX | ☐ INTERIOR DESIGN ESTIMATE | LEE MIJA | 09:44 |
| FILTER ∧ | ☐ EIGHTH PROPOSAL DRAFT | KIM YOUNGJA | 09:27 |
| IMPORTANCE FILTER | ☐ SEND REQUESTED PAMPHLET | LEE JINCHUL | 08:28 |
| UNOPENED | ☐ CHECK MEETING MATERIALS | LEE DONGJOO | 08:46 |
| FILE ATTACHMENT | ☐ SEND DRAWING PROPOSAL DRAFT | HWANG SOOJUNG | 08:35 |
| | ☐ NEXT YEAR'S BUDGET | PARK SOOJUNG | 07:24 |
| | ☐ VOCATION NOTICE | KO BYUNGWOOK | 06:10 |

701 (FILTER) → 703

FIG. 7B

| MAIL ⚙ ← | IN BOX | | |
|---|---|---|---|
| MAIL WRITE | TOTAL 15  ALL ⌄  CATEGORY ⌄  VIEW ⌄ | | |
| MAILBOX | ☐ \| TITLE | \| SENDER | \| DATE |
| INBOX 15 | ☐ 2016 THIRD FOREIGN LANGUAGE COURSE | XX EDUCATION INSTITUTE | 12:30 |
| SENT | ☐ MEETING RESULT | CHIEF KIM | 11:50 |
| DRAFT | ☐ BUSINESS TRIP REPORT | SUNG JINSOO | 11:24 |
| SPAM | ☐ SEPTEMBER EDUCATION GUIDE | DEPUTY SECTION CHIEF NA | 09:55 |
| DELETED | ☐ SEND REQUESTED PAMPHLET | LEE JINCHUL | 08:28 |
| SNOOZE | | | |
| + CREATE NEW MAILBOX | | | |
| MAILBOX | | | |
| FILTER ∧ | | | |
| IMPORTANCE FILTER | | | |
| ●━━━━ | | | |
| UNOPENED | | | |
| FILE ATTACHMENT | | | |

701, 701a, 701b → 705

METHOD AND APPARATUS FOR IMPORTANCE FILTERING A PLURALITY OF MESSAGES

CROSS-REFERENCE TO RELATED APPLICATIONS

This application based on and claims priority under 35 U.S.C. § 119 to Korean Patent Application No. 10-2016-0145948, filed on Nov. 3, 2016, and Korean Patent Application No. 10-2017-0111660, filed on Sep. 1, 2017, in the Korean Intellectual Property Office, the disclosures of which are incorporated by reference herein in their entireties.

BACKGROUND

Field

The present disclosure relates generally to a method and an apparatus of filtering a plurality of messages and displaying at least one message on a screen.

The present disclosure also relates generally to an AI (Artificial Intelligence) system that mimics functions such as recognition, determination, and the like of human's brain utilizing a machine learning algorithm, and an application thereof.

Description of Related Art

In accordance with the development of technology, various applications for improving convenience of a user have emerged.

In particular, a messenger application may provide a function of a real-time chatting using a message between a user and a third party. Examples of the messenger application may include various kinds of messenger applications for each of manufacturers, such as ChatON™, Kakao Talk™, Line™, WhatsApp™, TalkOn™, and the like.

The messenger application may have a chatting room function in which the user distinguishes the third party and performs the chatting.

A message history in which the user has talked with the third party may be displayed in the chatting room. In this case, as the chatting between the user and the third party is increased, an amount of the message history in the chatting room may be accumulated and increased.

Further, an artificial intelligence system that implements intelligence of a human-like level is recently used in various fields. Unlike an existing rule-based smart system, the artificial intelligence system is a system that a machine itself learns, determines, and becomes smart. Since the artificial intelligence system may have an improved recognition rate and more accurately understand a taste of the user as it is used, the existing rule-based smart system is increasingly replaced with a deep-learning based artificial intelligence system.

The artificial intelligence technology includes, for example, a machine learning (e.g., deep-learning) and element technologies utilizing the machine learning.

The machine learning is an algorithm technology that classifies/learns characteristics of input data by itself, and the element technology, which is technology of mimicking functions such as recognition, determination, and the like of a human's brain utilizing the machine learning algorithm such as the deep-learning, or the like, includes technical fields such as linguistic understanding, visual understanding, inference/prediction, knowledge expression, action control, and the like.

Various fields in which the artificial intelligence technology is applied include the following. The linguistic understanding is a technology of recognizing and applying/processing human's languages/characters, and includes natural language processing, machine translation, a dialogue system, query and response, voice recognition/synthesis, and the like. The visual understanding is a technology of recognizing and processing objects as human's vision and includes object recognition, object tracking, image search, human recognition, scene understanding, spatial understanding, image improvement, and the like. The inference/prediction is a technology of determining information and logically inferring and predicting the information and includes knowledge/probability based inference, optimization prediction, preference based plan, recommendation, and the like. The knowledge expression is a technology of performing an automated processing for experience information of human using knowledge data and includes knowledge building (data generation/classification), knowledge management (data utilization), and the like. The action control is a technology of controlling an autonomous driving of a vehicle and a motion of a robot and includes a motion control (navigation, collision, driving), operation control (behavior control), and the like.

SUMMARY

Example embodiments of the present disclosure address the above disadvantages and other disadvantages not described above.

When a message history in which a user has talked with a third party is displayed through a message application or the like, the user may feel difficulty in retrieving a specific message as an amount of the message history is large.

For example, when the user retrieves a desired message while scrolling a screen, the user may experience a difficulty in retrieving the message, as chatter messages, for example, such as "☺☺☺" and the like which are not important to a chatting context, are displayed on the screen.

Accordingly, an example aspect of the present disclosure is to quickly retrieve a message desired by a user by filtering the message and providing it to the user.

In addition, the technical problem addressed by the present disclosure is not limited to the technical problem mentioned above, and other technical problems which are not mentioned may be clearly understood by those skilled in the art from the following description.

According to an example aspect of the present disclosure, a method of filtering a plurality of messages by an electronic apparatus includes an operation of displaying at least some of the plurality of messages; an operation of receiving an input that requests a filtering of the plurality of messages; an operation of obtaining one or more messages having an importance that meets the filtering request from among the plurality of messages based on an importance of each of the plurality of messages, in response to the input; and an operation of displaying the one or more obtained messages.

According to another example aspect of the present disclosure, an electronic apparatus for filtering a plurality of messages includes a display configured to display at least some of the plurality of messages; an input unit comprising input circuitry configured to receive an input requesting a filtering of the plurality of messages; and a processor configured to obtain one or more messages having an importance that meets the filtering request from among the plurality of messages based on an importance of each of the plurality of messages, in response to the input, and to perform a control so that the display displays the one or more obtained messages.

According to another example aspect of the present disclosure, a non-transitory computer readable medium in which a program for filtering a plurality of messages is stored is provided, the program, when executed by a processor, causes an electronic apparatus to display at least some of the plurality of messages; receive an input requesting a filtering of the plurality of messages; obtain one or more messages having an importance that meets the filtering request from among the plurality of messages based on an importance of each of the plurality of messages, in response to the input; and display the one or more obtained messages.

According to an example embodiment of the present disclosure, as the one or more messages that meet the filtering request of the user are filtered and displayed based on the importance of each of the plurality of messages, the user may quickly find the message that the user wants to retrieve.

Further, since the plurality of messages are selectively filtered based on the importance of each of the plurality of messages corresponding to the filtering level, the user may overview the messages as a whole or effectively retrieve a specific message.

Accordingly, since the usability using the message application is improved, it is possible to increase satisfaction of the user using the electronic apparatus.

Accordingly, effects which are obtainable or predicted by the example embodiments of the present disclosure will be directly or implicitly disclosed in a detailed description for the example embodiments of the present disclosure. For example, various effects predicted according to the example embodiments of the present disclosure will be disclosed in a detailed description to be described below.

BRIEF DESCRIPTION OF THE DRAWINGS

The above and/or other aspects, features and attendant advantages of the present disclosure will be more apparent and readily appreciated from the following detailed description, taken in conjunction with the accompanying drawings, in which like reference numerals refer to like elements, and wherein:

FIGS. 5A, 5B, 6A, 6B, 7A and 7B are diagrams illustrating use examples of an electronic apparatus of filtering a message according to another example embodiment of the present disclosure;

DETAILED DESCRIPTION

Figure 1A:
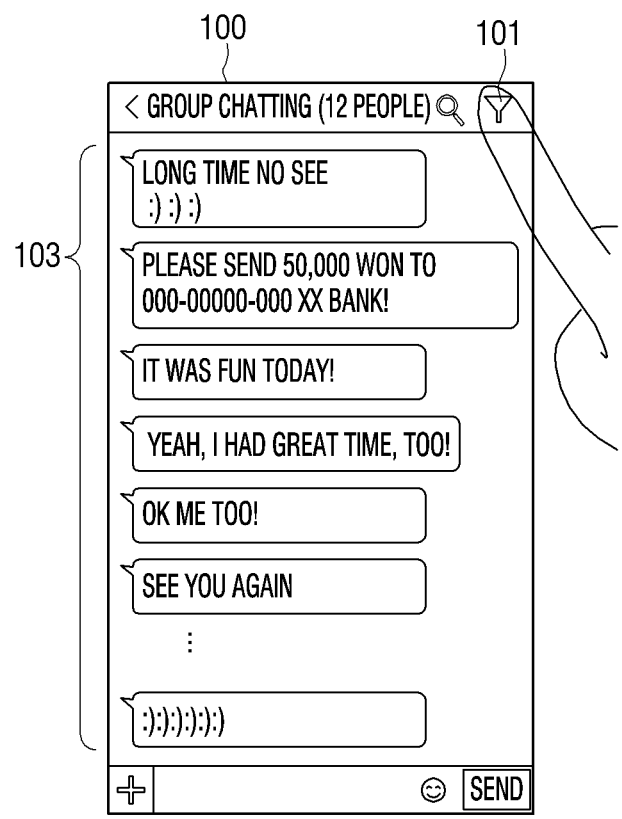
FIGS. 1A and 1B are diagrams illustrating use examples of an electronic apparatus of filtering a message according to an example embodiment of the present disclosure.

Hereinafter, various example embodiments of the present disclosure will be described with reference to the accompanying drawings. However, it is to be understood that technologies mentioned in the present disclosure are not limited to specific example embodiments, but include all modifications, equivalents, and/or substitutions according to example embodiments of the present disclosure. Throughout the accompanying drawings, similar components will be denoted by similar reference numerals.

In the present disclosure, an expression "have", "may have", "include", "may include", or the like, indicates existence of a corresponding feature (for example, a numerical value, a function, an operation, a component such as a part, or the like), and does not exclude existence of an additional feature.

In the present disclosure, an expression "A or B", "at least one of A and/or B", "one or more of A and/or B", or the like, may include all possible combinations of items enumerated together. For example, "A or B", "at least one of A and B", or "at least one of A or B" may indicate all of 1) a case in which at least one A is included, 2) a case in which at least one B is included, or 3) a case in which both of at least one A and at least one B are included.

Expressions "first", "second", or the like, used in the present disclosure may indicate various components regardless of a sequence and/or importance of the components, will be used to distinguish one component from the other components, and do not limit the corresponding components.

When it is mentioned that any component (for example, a first component) is (operatively or communicatively) coupled with/to or is connected to another component (for example, a second component), it is to be understood that any component is directly coupled to another component or may be coupled to another component through the other component (for example, a third component). On the other hand, when it is mentioned that any component (for example, a first component) is "directly coupled" or "directly connected" to another component (for example, a second component), it is to be understood that the other component (for example, a third component) is not present between any component and another component.

An expression "configured (or set) to" used in the present disclosure may be used interchangeably with an expression "suitable for", "having the capacity to" "designed to", "adapted to", "made to", or "capable of" depending on a situation. A term "configured (or set) to" may not necessarily refer to "specifically designed to" in hardware. Instead, an expression "an apparatus configured to" may refer to a situation in which the apparatus may "do" or "perform" together with other apparatuses or components. For example, a "processor configured (or set) to perform A, B, and C" may refer, for example, and without limitation, to a dedicated processor (for example, an embedded processor) for performing the corresponding operations or a generic-purpose processor (for example, a central processing unit (CPU) or an application processor (AP)) that may perform the corresponding operations by executing one or more software programs stored in a memory apparatus.

Terms used in the present disclosure may be used to describe specific example embodiments rather than restricting the scope of other example embodiments. Singular forms may include plural forms unless the context clearly indicates otherwise. Terms used in the present disclosure including technical and scientific terms have the same meanings as those that are generally understood by those skilled in the art to which the present disclosure pertains. Terms defined by a general dictionary among terms used in the present disclosure may be interpreted as being the same as or similar to meanings within a context of the related art, and are not interpreted to have ideal or excessively formal meanings unless clearly defined in the present disclosure. In some cases, even where terms are defined in the disclosure, the terms may not be interpreted to exclude example embodiments of the present disclosure.

An electronic apparatus according to various example embodiments of the present disclosure may include, for example, at least one of a smartphone, a tablet PC, a mobile phone, an image phone, an e-book reader, a desktop PC, a laptop PC, a netbook computer, a workstation, a server, a PDA, a portable multimedia player (PMP), an MP3 player, a medical device, a camera, or a wearable device, or the like, but is not limited thereto. The wearable device may include at least one of an accessory type (e.g., watches, rings, bracelets, braces, necklaces, glasses, contact lenses, or head-mounted-devices (HMD)), fabric or clothing-integrated type (e.g., electronic clothes), body-attached type (e.g., skin pad or tattoo), or a bio-implanted type circuit, or the like, but is not limited thereto. In some example embodiments, the electronic apparatus may include, for example, at least one of a television, a digital video disk (DVD) player, an audio, a refrigerator, an air conditioner, a cleaner, an oven, an electronic oven, a washing machine, an air purifier, a set-top box, a home automation control panel, a secure control panel, a media box (e.g., Samsung HomeSync™, AppleTV™, or Google TV™), a game console (e.g., Xbox™, PlayStation™), an electronic dictionary, an electronic key, a camcorder, or an electronic frame, or the like, but is not limited thereto.

According to another example embodiment, the electronic apparatus may include at least one of variety of medical devices (e.g., variety of portable medical measuring devices (blood glucose meter, heart rate meter, blood pressure meter, body temperature measuring instrument, or the like), magnetic resonance angiography (MRA), magnetic resonance imaging (MRI), computed tomography (CT), radiograph, a ultrasonic device, or the like), a navigation device, a satellite navigation system (GNSS (global navigation satellite system)), an event data recorder (EDR), a flight data recorder (FDR), a vehicle infotainment device, electronic equipments for marine (e.g., a navigation device for marine, a gyrocompass, and the like), avionics, a secure device, a head unit for vehicle, industrial or home robots, a drone, automated teller machines (ATM) of financial institution, point of sales (POS) of stores, or Internet of Things devices (e.g., light bulbs, various sensors, sprinkler devices, fire alarms, thermostats, street lights, toasters, exercise equipments, hot water tank, heaters, boilers, etc.), or the like, but is not limited thereto.

According to some example embodiments, the electronic apparatus may include a portion of furniture, a building/structure, or a vehicle, an electronic board, an electronic signature receiving device, a projector, or various measuring devices (e.g., water, electricity, gas, or radio wave measuring instruments), or the like, but is not limited thereto. In various example embodiments, the electronic apparatus may be flexible, or may be a combination of two or more of the various devices described above. The electronic apparatus according to an example embodiment of the present disclosure is not limited to the devices described above.

In the present disclosure, a term "user" may refer to a person using the electronic apparatus or an apparatus (e.g., an artificial intelligence electronic apparatus) using the electronic apparatus.

Figure 1B:
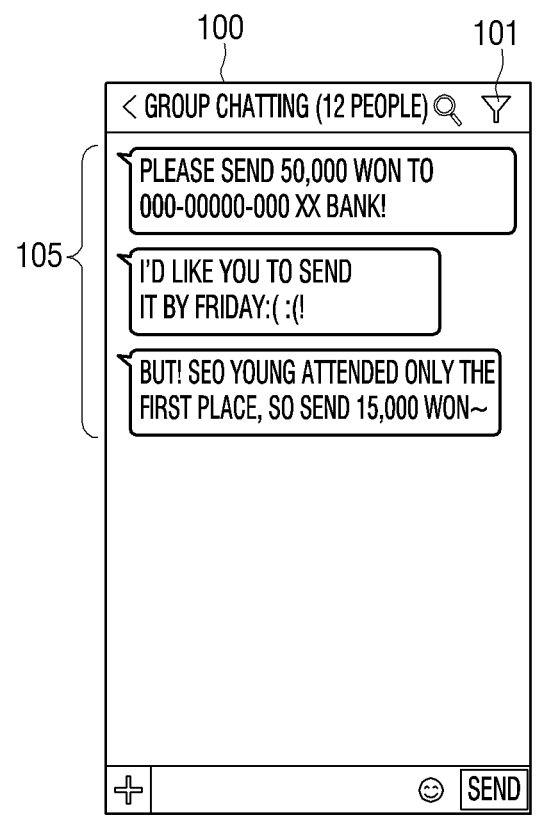

FIGS. 1A and 1B are diagrams illustrating use examples of an electronic apparatus of filtering a message according to an example embodiment of the present disclosure.

Referring to FIG. 1A, an electronic apparatus 100 may display at least some 103 of a plurality of messages on a screen.

In this case, the plurality of messages may be messages that a user and a third party have talked with each other in a chatting room, and all or some of the plurality of messages may be displayed on the screen of the electronic apparatus 100.

The electronic apparatus 100 may provide a filtering UI 101 for filtering the plurality of messages.

In this case, the electronic apparatus 100 may receive an input, e.g., a user input, that requests the filtering of the plurality of messages. For example, the electronic apparatus 100 may receive a touch input of the user that selects the filtering UI 101.

In response to the input of the user, the electronic apparatus 100 may filter the plurality of messages. For example, the electronic apparatus 100 may filter the plurality of messages according to a predetermined filtering level. The filtering level may also be predetermined by the user, or may also be predetermined by a manufacturer of the electronic apparatus 100, or a manufacturer of an application performing an operation according to the present disclosure, or a developer.

The electronic apparatus 100 may obtain one or more messages having importance that meets the filtering request of the user, from among the plurality of messages based on importance of each of the plurality of messages. To this end, the electronic apparatus 100 may determine importance of each of the messages by applying each of the plurality of messages to a message analysis engine as described, for example, in greater detail below. In addition, the electronic apparatus 100 may filter the plurality of messages by obtaining one or more messages having importance that meets the filtering request of the user based on the determined importance of each of the plurality of messages.

In this case, the electronic apparatus 100 may calculate a message score of each of the plurality of messages. In addition, the electronic apparatus 100 may determine the importance of each of the plurality of messages based on the calculated score of each of the plurality of messages.

As illustrated in FIG. 1B, the electronic apparatus 100 may display one or more filtered messages 105 on the screen.

Figure 2:
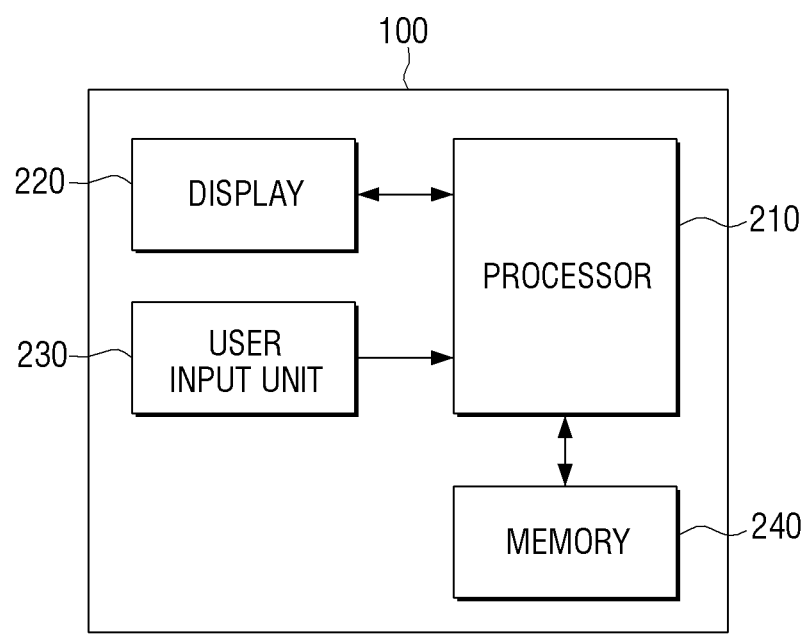
FIG. 2 is a block diagram illustrating an example electronic apparatus according to an example embodiment of the present disclosure.

FIG. 2 is a block diagram illustrating an example electronic apparatus 100 according to an example embodiment of the present disclosure.

FIG. 2 is a block diagram illustrating an example configuration of an electronic apparatus 100 according to various example embodiments of the present disclosure. The electronic apparatus 100 of FIG. 2 may include the entirety or a portion of an electronic apparatus 100 of FIG. 11 to be described below.

Referring to FIG. 2, the electronic apparatus 100 may include a processor (e.g., including processing circuitry) 210, a display 220, a user input unit (e.g., including input circuitry) 230, and a memory 240. The components illustrated in FIG. 2 are illustrated to implement example embodiments of the present disclosure, and appropriate hardware/software components of a level which is apparent to those skilled in the art may be further included in the electronic apparatus 100.

The display 220 may provide a display region on which visual information is displayed. The display 220 may include the entirety or a portion of a display 1130 of FIG. 11 to be described below, and a detailed example of the display 220 is not provided here, as it will be described with reference to the display 1130 of FIG. 11.

The user input unit 230 may include various input circuitry and receive a user input operating the electronic apparatus 100 and transmit input information to the processor 210. The user input unit 230 may include the entirety or a portion of a user input unit 1180 of FIG. 11 to be described in greater detail below, and a detailed example of the user input unit 230 will be omitted here as will be described with reference to the user input unit 1180 of FIG. 11.

The memory 240 may store instructions or data associated with one or more other components of the electronic apparatus 100. The memory 240 may include the entirety or a portion of a memory 1150 of FIG. 11 to be described in greater detail below, and a detailed example of the memory 240 will not be provided here because it will be described with reference to FIG. 11.

For example, the memory 240 may store at least some of the plurality of messages or link addresses of the plurality of messages according to the present disclosure. The memory 240 may also store importance of each of the plurality of messages according to the present disclosure. The memory 240 may also store a general model database (DB) according to the present disclosure to be described in greater detail below.

The processor 210 may include various processing circuitry and be electrically connected to the display 220, the memory 240, and the user input unit 230 to control a general operation and function of the electronic apparatus 100. The processor 210 may include the entirety or a portion of a processor 1190 of FIG. 11 to be described in greater below, and a detailed example of the processor 210 will not be provided here as it will be described with reference to the processor 1190 of FIG. 11.

According to various example embodiments, the display 220 may display at least some of the plurality of messages. Here, the plurality of messages may include whole messages included in the chatting room that the user has talked with the third party, whole comments about specific contents, or whole e-mails stored in an e-mail inbox. The user input unit 230 may receive a user input that requests the filtering of the plurality of messages. In response to the received user input, the processor 210 may obtain one or more messages having importance that meets the filtering request of the user, among the plurality of messages based on importance of each of the plurality of messages. In addition, the processor 210 may control the display 220 to display the one or more obtained messages.

In this case, the processor 210 may calculate (determine) a message score of each of the plurality of messages. The message score may, for example, and without limitation, be calculated based on at least one of the number of specific words included in the plurality of messages, the number of the plurality of messages, a weight for each of types of the specific word included in the plurality of messages, an occurrence frequency of the specific word included in the plurality of messages, and a provision time of each of the plurality of messages. In addition, the processor 210 may determine the importance of each of the plurality of messages based on the calculated score of each of the plurality of messages. The importance of each of the plurality of messages may be determined based on the score of each of the plurality of messages, a ranking of the score, a percentile of the score, a percentile of the ranking, or the like.

According to various example embodiments, the user input unit 230 may receive a user input that selects a filtering level of the plurality of messages. In this case, the processor 210 may obtain one or more messages having importance that meets the selected filtering level among the plurality of messages based on the importance of each of the plurality of messages. For example, the processor 210 may obtain one or more messages having an importance which is greater than or equal to the selected filtering level among the plurality of messages based on the importance of each of the plurality of messages.

According to various example embodiments, the display 220 may, for example, and without limitation, display a filtering bar and an indicator positioned on the filtering bar. In this case, the user input unit 230 may receive a user input that moves a position of the indicator positioned on the filtering bar. In response to the received user input, the processor 210 may obtain one or more messages having importance that meets the filtering level corresponding to the position of the indicator, among the plurality of messages based on the importance of each of the plurality of messages.

According to various example embodiments, the display 220 may, for example, and without limitation, display a plurality of buttons that correspond to each of a plurality of filtering levels. In this case, the user input unit 230 may receive a user input that selects one button of the plurality of buttons. In response to the received user input, the processor 210 may obtain one or more messages having importance that meets the filtering level corresponding to the selected one button, among the plurality of messages based on the importance of each of the plurality of messages.

Figure 3:
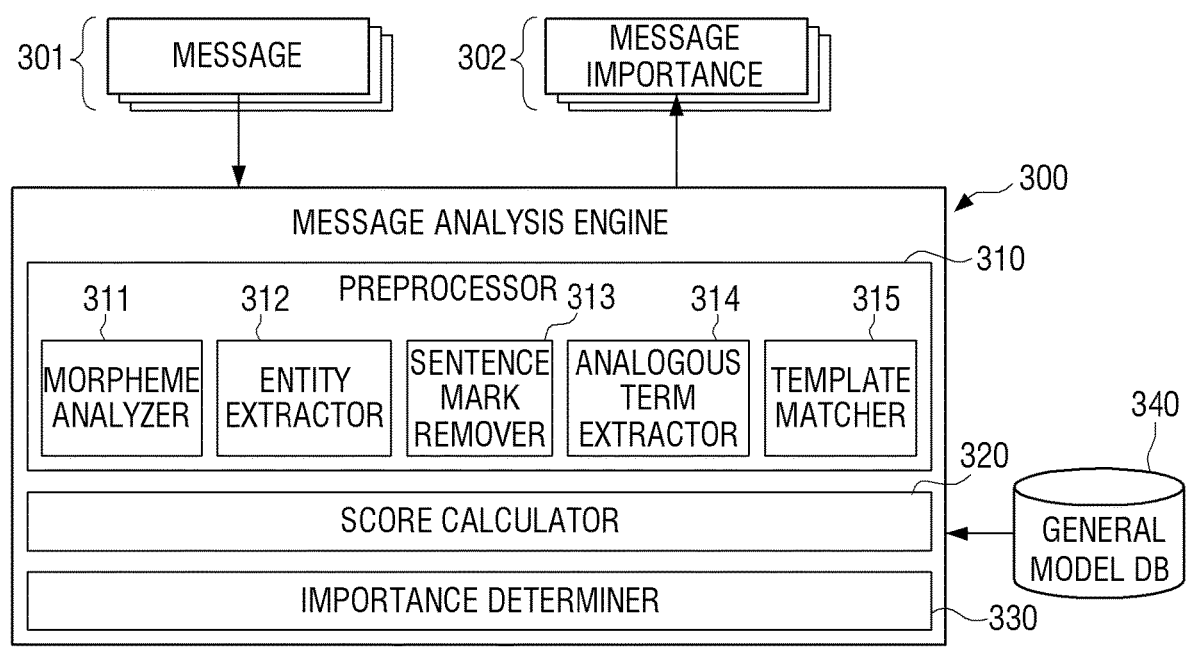
FIG. 3 is a block diagram illustrating an example message analysis engine that determines importance of a message according to an example embodiment of the present disclosure.

FIG. 3 is a block diagram illustrating an example message analysis engine that determines importance of a message according to an example embodiment of the present disclosure.

A message analysis engine 300 of FIG. 3 may also be referred to as a natural language processing (NLP) module or a natural language processing engine.

The message analysis engine 300 may be included in the electronic apparatus according to the present disclosure, or an external device which is connected to the electronic apparatus 100 according to the present disclosure through a wire or wireless network. In this case, the external device may be one of the electronic apparatuses described above, and may be generally the server. In this case, the external device may be a cloud including a plurality of servers.

Further, the message analysis engine 300 may be implemented in a software module or manufactured in a form of a hardware chip, and may also be mounted in the electronic apparatus or the server. Further, the message analysis engine 300 may also be manufactured in a form of a dedicated hardware chip or manufactured in a portion of an existing general-purpose processor (e.g., a central processing unit (CPU) or an application processor) or a graphic dedicated processor (e.g., graphic processing unit (GPU)), and may also be mounted in the electronic apparatus described above.

In a case in which the message analysis engine 300 is implemented in a software module (or a program module including instructions), the software module may be stored in a non-transitory computer readable medium. Since detailed examples of the non-transitory computer readable medium will be described below, a detailed description thereof will not be provided here.

The message analysis engine 300 may receive a plurality of messages 301 and output importance 302 of each of the plurality of messages.

The message analysis engine 300 may include a preprocessor (e.g., including processing circuitry and/or program elements) 310, a score calculator (e.g., including processing circuitry and/or program elements) 320, and an importance determiner (e.g., including processing circuitry and/or program elements) 330. In the present disclosure, for convenience of explanation, as described above according to the function or purpose, although the message analysis engine 300 is classified into a plurality of ~ units or ~ modules, it is to be understood that the plurality of ~ units or ~ modules are combined with each other to be implemented in one or two ~ units, or the message analysis engine may be classified into a large number of ~ units to be implemented.

The preprocessor 310 may perform a preprocessing for the plurality of received messages.

The preprocessor 310 may include a morpheme analyzer (e.g., including processing circuitry and/or program elements) 311, an entity extractor (e.g., including processing circuitry and/or program elements) 312, a sentence mark remover (e.g., including processing circuitry and/or program elements) 313, an analogous term extractor (e.g., including processing circuitry and/or program elements) 314, and a template matcher (e.g., including processing circuitry and/or program elements) 315.

The morpheme analyzer 311 may determine morphemes included in the message and determine sentence components of the determined morphemes.

For example, the morpheme analyzer 311 may determine "meeting", "quickly", "attend", and "please", as the morphemes included in a message "Please quickly attend the meeting". Further, the morpheme analyzer 311 may determine "meeting" and "quickly" as adverbs, "attend" as a predicate, and "please" an honorific indicating an honorific title, as the determined sentence components of the morphemes.

Further, the morpheme analyzer 311 may determine a sending intention of the received message and whether or not the honorific title is used, based on the determined sentence components. For example, the morpheme analyzer 311 may determine a verb included in the message "Please quickly attend the meeting" as "attend", determine the sending intention of the received message as an intention to order to attend, and determine that the received message is a message expressed with the honorific title.

The entity extractor 312 may extract a word of a type of named entity included in the message. The named entity may mean a noun or number having a unique meaning that represents in a document. The named entity may be broadly classified into a name expression such as a name, a place, or an organization name, a time expression such as a date or a time, a numerical expression such as a sum of money or a percentage, and the like. The entity extractor 312 may recognize the named entity included in the message, and determine a kind of the recognized named entity. For example, if a message "Mr. Gil-dong, do you want to have a dinner at A restaurant" is received, the entity extractor 312 may extract "Gil-dong" and "A restaurant" as words of the type of the named entity.

The sentence mark remover 313 may remove blanks or sentence marks included in the message. The sentence mark may include, for example, final marks such as a question mark, a period mark, an exclamation mark, an ending mark, and the like, or quotation marks such as a quotation and the like.

For example, in a case in which some of the sentence marks are used as information, the sentence mark remover 313 may remove only the other kind of sentence mark while remaining one kind of sentence mark. For example, the sentence mark remover 313 may maintain the sentence marks which are used as information representing a character of the sentence such as the question mark or the exclamation mark, and remove the sentence marks such as the period mark, a comma, and the like which have a low relation with the characteristic of the sentence.

The analogous term extractor 314 may extract an analogous word of the words included in the message. The analogous term extractor 314 may extract the analogous word from a general model database (DB) 340. The general model DB 340 may, for example, and without limitation, be a word dictionary DB, and may be provided to at least one of the electronic apparatus 100 and the external server (e.g., a wordnet server or the like). In this case, as the analogous word, a word having the highest frequency of use may be selected among analogous words related to the word included in the message. The analogous word may be selected based on similarity. For example, a word having the highest similarity with the word included in the message may be selected as the analogous word.

The template matcher 315 may extract words having a form which is matched to a pre-provided template among the words included in the message.

For example, the template matcher 315 may extract a word having a form which is matched to "000-000-0000", which is the template for a telephone number, as a word of a telephone number type. The template matcher 315 may also extract a word having a form which is matched to "000-000000-000" as a word of an account number type. The templates for each of the types may be stored in the general model DB 340, and the template matcher 315 may extract the words included in the message using the templates stored in the general model DB 340.

Figure 4A:
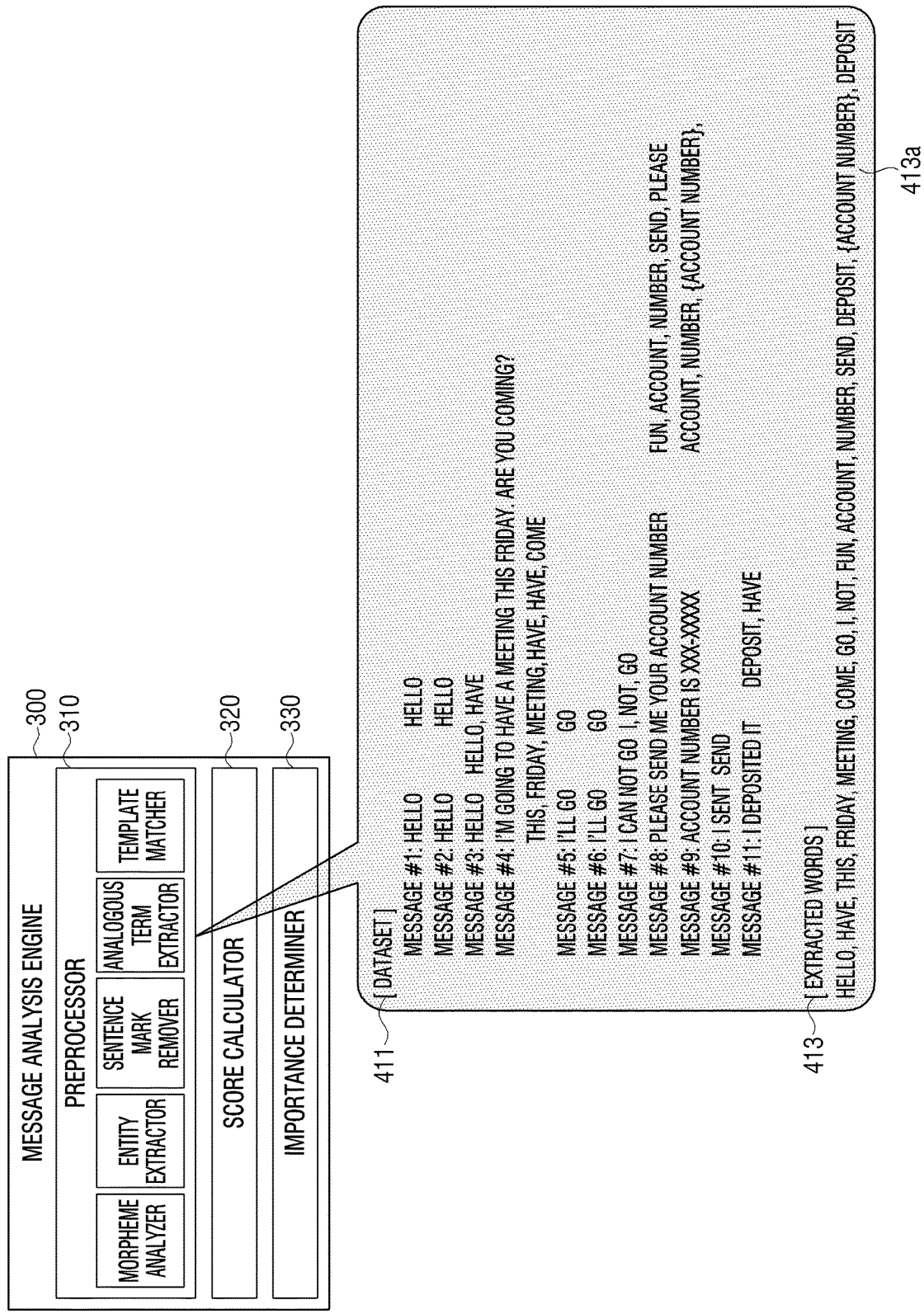
FIG. 4A is a diagram illustrating an example message preprocessing process of the message analysis engine according to an example embodiment of the present disclosure.

FIG. 4A is a diagram illustrating an example message preprocessing process of the preprocessor 310 of the message analysis engine 300 according to an example embodiment of the present disclosure.

In FIG. 4A, a dataset 411 may include a plurality of messages. The plurality of messages may be message that the user has talked with the third party in the chatting room. The dataset 411 may include message #1 to message #11 according to a time order that the user has talked with the third party.

In FIG. 4A, the preprocessor 310 may receive data 411, process the received dataset, and extract a plurality of words 413.

In this case, the preprocessor 310 may exclude morphemes which are not important from each of the plurality of messages. The morphemes which are not important may be for example, dependent morphemes or formal morphemes, and may include affixes to assist in the meaning of the word, postpositions to qualify the word, endings representing a tense or changing the nature of word class, and the like.

Further, the preprocessor 310 may extract the word having the form which is matched to the template from the plurality of messages. For example, the preprocessor 310 may extract a word 413a having a form which is matched to an account number template using the account number template.

The score calculator 320 of the message analysis engine 300 may calculate the score of each of the messages for which the preprocessing is performed.

Figure 4B:
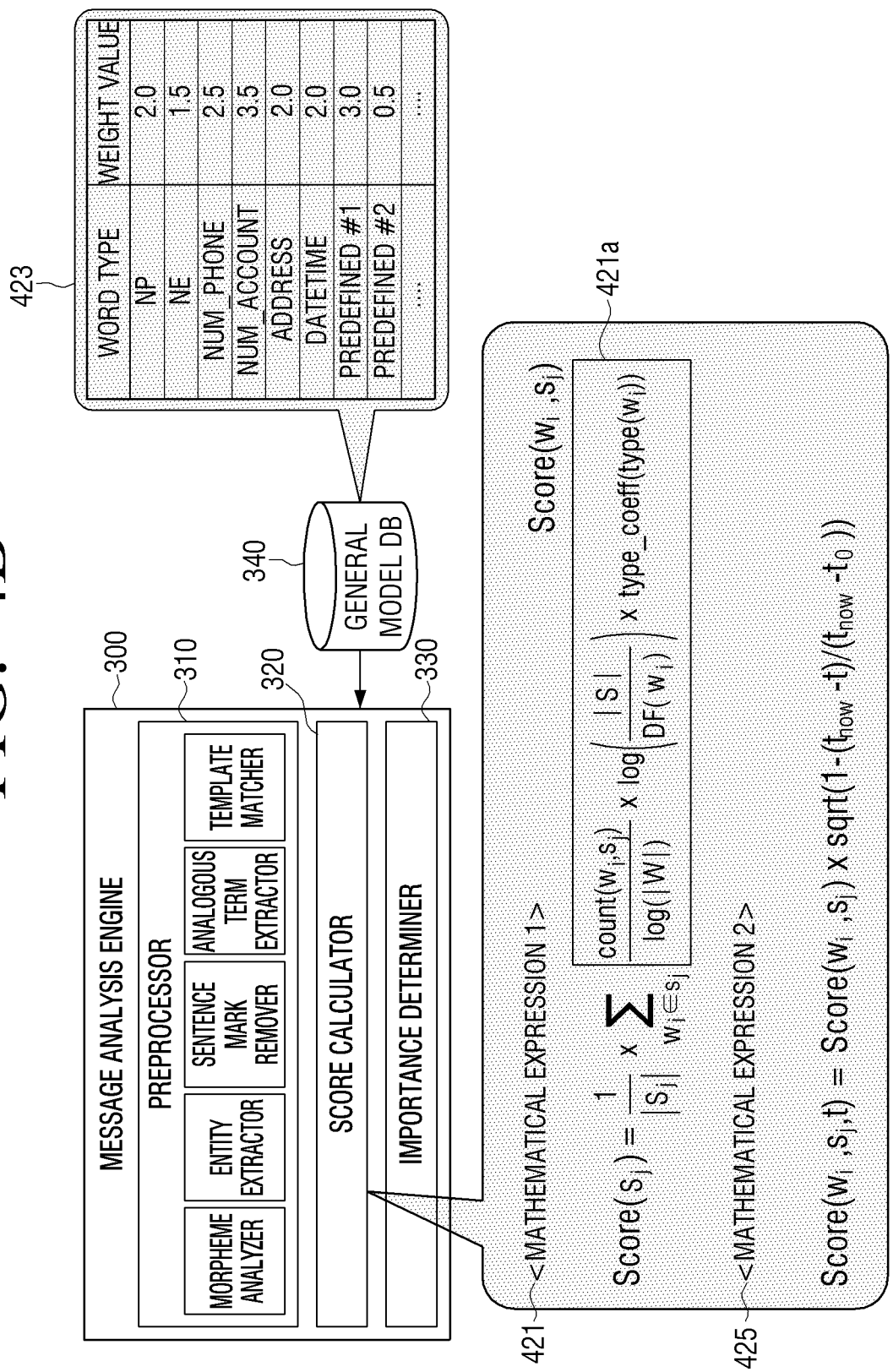
FIG. 4B is a diagram illustrating an example process of calculating a score of a message in a score calculator of the message analysis engine according to an example embodiment of the present disclosure.

FIG. 4B is a diagram illustrating an example process of calculating the score of the message in the score calculator 320 of the message analysis engine 300 according to an example embodiment of the present disclosure.

In FIG. 4B, <Mathematical expression 1> 421 represents Score($s_j$), which is Expression of calculating a score of a j-th message of the plurality of messages. Here, the plurality of messages may be, for example, whole messages included in one chatting room.

In <Mathematical expression 1> 421, $|s_j|$ represents the number of words included in a j-th message. In this case, the words may be words which are derived as a result of performing the preprocessing in the preprocessor 310.

Count($w_i, s_j$) may represent an occurrence frequency number of a word $w_i$ included in the j-th message.

|W| may represent the number of all words included in the plurality of messages.

|S| may represent the number of the plurality of messages.

DF($w_i$) may represent an occurrence frequency of the word $w_i$ among the plurality of messages. That is, DF($w_i$) may represent the number of the messages including the word $w_i$ among the plurality of messages. In this case, DF($w_i$) may also use statistic value of the occurrence frequency of the word $w_i$. The statistic value of the occurrence frequency may be stored in the general model DB 340 and may be obtained by the score calculator 320.

Type($w_i$) may represent a type of the word $w_i$.

type_coeff(type($w_i$)) may represent a weight value for each of the types of the word $w_i$.

In this case, the type of the word and the weight value for each of the types may also use a matching table, as in Table 423 of FIG. 4B.

In the matching table of Table 423, the type of word may be determined by a preprocessor 310 of the message analysis engine 300. Alternatively, the type of each of words may be stored in the general model DB 340, and the score calculator 320 may also determine the type of each of the words using the general mode DB 340.

In the matching table of Table 423, the type of the word may include, for example, a noun proper (NP), which is a proper noun, a named entity (NE), which is an entity name as a subset of the proper noun, NUM_PHONE, which is a telephone number, NUM_ACCOUNT, which is an account number, DATATIME, which is a date, and PREDEFINED #1 and PREDEFINED #2, which are predetermined other types, and the matching table may be in a state in which the weight value is matched to each of the types of the respective words. In this case, the matching table in which the weight value is matched to each of the types of the word may be stored in the general model DB 340 and may be invoked as needed.

According to an example embodiment, the type of the word may also be a result obtained by clustering a plurality of words. For example, in a case in which words "deposit", "account", and "withdraw" exist in the plurality of messages, the respective words may be defined as one type of the word related to a bank and may be applied with the same weight value.

Further, the type of the word may also be determined by considering the analogous term and a class of the word. For example, "bookstore", "bookshop", etc., which are the analogous terms, may be grouped into one group corresponding to one type of the word, and may be applied with the same weight value. Alternatively, "rabbit", "deer", "elephant", "hippopotamus", etc., which are subclass of herbivores, may be grouped into a group corresponding to a type of a word related to the herbivores, and may be applied with the same weight value.

In this case, a reference of grouping the plurality of words may also be determined by using an analogous term dictionary or a class dictionary of word stored in the general model DB 340. Further, the reference of grouping the plurality of words may also be determined based on a message processing history accumulated according to the present disclosure, and may also be determined based on a message processing history of a third party which is already learned.

Further, the type of each of the words may also be arbitrarily determined by a setting of the user or a manufacturer or a manager of the message analysis engine 300. In this case, words having low common feature may be arbitrarily grouped and may also be defined as one type of the word.

Again, in <Mathematical expression 1> 421, the score for each of the words included in the message may be calculated through a calculation illustrated in box 421a. The scores of the words included in the message are all summed through a sigma expression ($\Sigma$), and as a result of multiplying $1/|s_j|$ with the summed result, a score average for each of the words included in the message may be derived. This may be a score of a j message.

In other words, the score of the j message may be calculated based on at least one of the number of a specific word (a word wi) included in the plurality of messages, the number of the plurality of messages, the weight value of each of the types of the specific word (the word wi) included in the plurality of messages, and the occurrence frequency of the specific word (the word wi) included in the plurality of messages.

Meanwhile, a method of calculating the score of the message is not limited to the Mathematical expression described above and the score of the message may also be calculated based on various methods. For example, in a case in which several sentences exist, an algorithm calculating an order of the sentences may be used. As an example, the order of each of the plurality of messages may also be calculated using an algorithm TextRank, and the score of each of the plurality of messages may also be output through a machine learning algorithm.

As a detailed example, it may be assumed that the words and the occurrence frequency of each of the words which are derived as the preprocessing result of the plurality of messages are as follow DF(document frequency).

DF(document frequency)={hello (three times), do (three times), this time (one time), Friday (one time), meeting (one time), come (one time), go (three times), I (one time), not (one time), fun (one time), account (two times), number (two times), send (two times), deposit (one time), {account number} (one time)}

In this case, as the occurrence frequency for each of the words, the occurrence frequency for each of the words for the plurality of messages as well as the occurrence frequency of each of the words which is pre-generated based on histories that the user has previously used with other third parties or a history that third parties unrelated to the user have talked with each other may also be used. In this case, the occurrence frequency of each of the pre-generated words may be pre-stored in the general model DB 340.

A weight value of each of the words may be determined according to the type of the word.

For example, based on the matching table of Table 423, the type of some words of the plurality of messages and the weight value according to the type of the word may be determined as in Table 1 below.

TABLE 1

| Word | Type of Word | Weight Value |
|---|---|---|
| Friday | DATETIME | 2.0 |
| {Account Number} | NUM_ACCONT | 3.5 |
| Account, Deposit, Meeting | PREDEFINED | 3.0 |
| Hello, Do | PREDEFINED | 0.5 |

In a detailed example, when it is assumed that the number of the plurality of messages is 10 and the number of the words included in the plurality of messages is 25, a value of |S| may be 10 and a value of |W| may be 25.

The message analysis engine 300 may determine the score for each of the messages by substituting the value described above into <Mathematical expression 1> 421 of FIG. 4B.

For example, in a case in which the word included in a first message of the plurality of messages is {Hello}, a value of $Score(S_1)$, which is the score for each of the messages substituted into <Mathematical expression 1> 421 may be $1 \times (1/\log(25) \times \log(10/3) \times 0.5) = 0.187$.

Further, in a case in which the words included in a fourth message of the plurality of messages are {this time, Friday, meeting, do, come}, a value of $Score(S_4)$, which is the score for each of the messages substituted into <Mathematical expression 1> 421 may be $(1/5) \times ((1/\log(25) \times \log(10/1) \times 1.0) + (1/\log(25) \times \log(10/1) \times 2.0) + (1/\log(25) \times \log(10/1) \times 3.0) + (2/\log(25) \times \log(10/1) \times 0.5) + (1/\log(25) \times \log(10/1) \times 1.0)) = 1.145$.

Further, in a case in which the words included in a ninth message of the plurality of messages are {account, number, {account number}}, a value of $Score(S_9)$, which is the score for each of the messages substituted into <Mathematical expression 1> 421 may be $(1/3) \times ((1/\log(25) \times \log(10/2) \times 3.0) + (1/\log(25) \times \log(10/2) \times 3.0) + (1/\log(25) \times \log(10/1) \times 3.5)) = 1.835$.

Meanwhile, the score calculator 320 may also calculate the score for each of the messages by reflecting an importance decay of the message over a time at which the message is generated. For example, since the score calculator 320 determines that the importance of the message is decreased as the generated time of the message becomes longer, it may reflect a time factor so that a score value of an old message is calculated to be low.

For example, a box 421a of a dot line of <Mathematical expression 1> 421 of FIG. 4B may be substituted with <Mathematical expression 2> 425 of FIG. 4B to which the time factor is reflected.

<Mathematical expression 2> 425 represents $Score(w_i, s_j, t)$, which is a score for each of the words included in the message to which the time factor is reflected.

$Score(w_i, s_j)$ in <Mathematical expression 2> 425, which is a score for each of the words included in the message, may correspond to the calculation result of the box 421a of <Mathematical expression 1> 421.

$t_0$ represents an open time of the chatting room including the plurality of messages or an input time of a message which is firstly input among the plurality of messages.

$t_{now}$ represents a provision time of the message including the word. Here, the provision time of the message means a time at which the message is input from the user, a time at which the message is transmitted from the third party, or a time at which the provided message is processed and is displayed on the screen, and includes a range of error of several seconds according to an operation of processing the message.

sqrt, which is a formula calculating a square root, may be applied to reflect a gentle time factor to $Score(w_i, x_j)$.

Figure 4C:
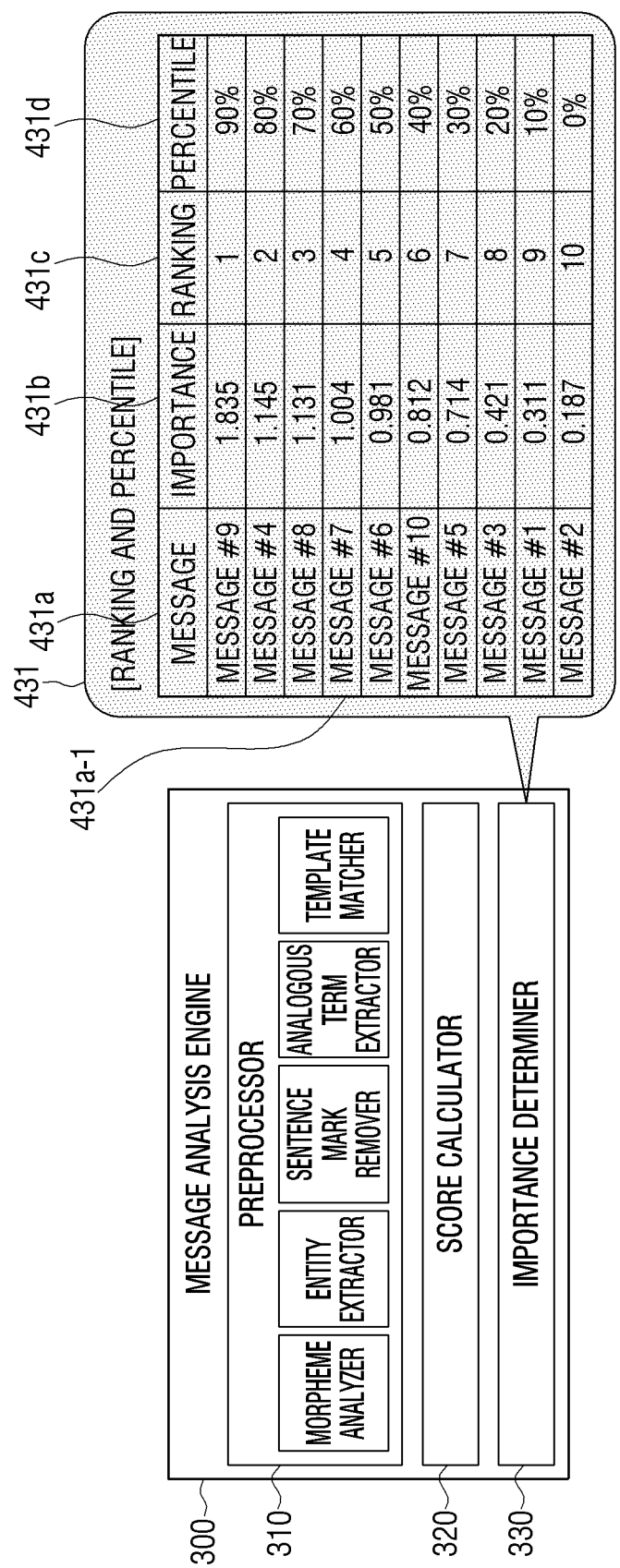
FIG. 4C is a diagram illustrating an example process of determining importance of a message in an importance determiner of the message analysis engine according to an example embodiment of the present disclosure.

FIG. 4C is a diagram illustrating an example process of determining the importance of the message in the importance determiner 330 of the message analysis engine 300 according to an example embodiment of the present disclosure.

The importance determiner 330 may determine the importance of the message by using the score for each of the messages calculated by the score calculator 320.

The importance determiner 330 may represent the importance of the message as a ranking or a percentile, based on the score for each of the messages.

For example, in 431 of FIG. 4C, the plurality of messages 431a may include a message #1 to a message #10.

In this case, an importance 431b of each of the plurality of messages 431a may be in a state calculated by the score calculator 320.

The importance determiner 330 may determine a ranking 431c of each of the plurality of messages 431a based on the score 431b of each of the plurality of messages 431a calculated by the score calculator 320. In this case, since the message has a high importance as it has higher score, it may be assigned to an upper ranking.

Further, the importance determiner 330 may determine a percentile 431d of each of the plurality of messages based on the calculated score or the determined ranking 431c.

The percentile may be a calculation method that represents a percentage of a specific message of the plurality of messages.

For example, in a case in which the percentile of a specific message (e.g., a message #7) 431a-1 is 60%, it may mean that the messages having the importance lower than the specific message 431a-1 occupies 60% of the plurality of whole messages 431a. Alternatively, it may mean that the messages having the importance higher than the specific message 431a-1 occupies 40% of the plurality of whole messages 431a.

According to various example embodiments, the message analysis engine 300 may use a data analysis model which is previously built. Here, the data analysis model which is previously built may be generated using a learning algorithm. In this case, the data analysis model may be, for example, a neural network based model. For example, the models such as Linear Regression, Logistic Regression, DNN (Deep Neural Network), CNN (Convolutional Neural Network), RNN (Recurrent Neural Network), and BRDNN (Bidirectional Recurrent Deep Neural Network) may be used, but are not particularly limited thereto.

In this case, the plurality of messages themselves, or the result of the preprocessing of the plurality of messages performed by the preprocessor 310 of FIG. 3, or the scores of the plurality of messages performed by the score calculator 320 of FIG. 3 may be input values of the data analysis model. The importance for each of the plurality of messages, which is the filtering result, and the like may be output values of the data analysis model.

An example embodiment in which the importance of the message is analyzed using the data analysis model will be described in greater detail below with reference to FIGS. 12 to 15.

Figure 5A:
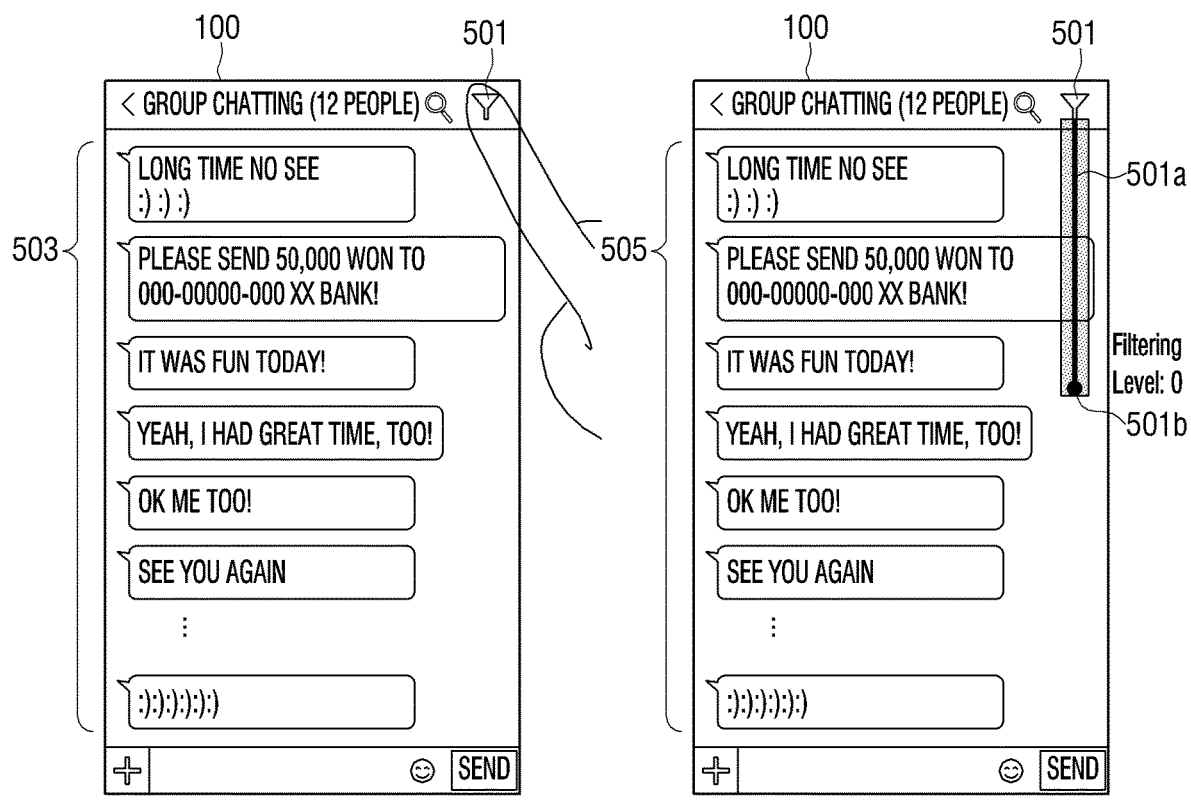
Figure 5B:
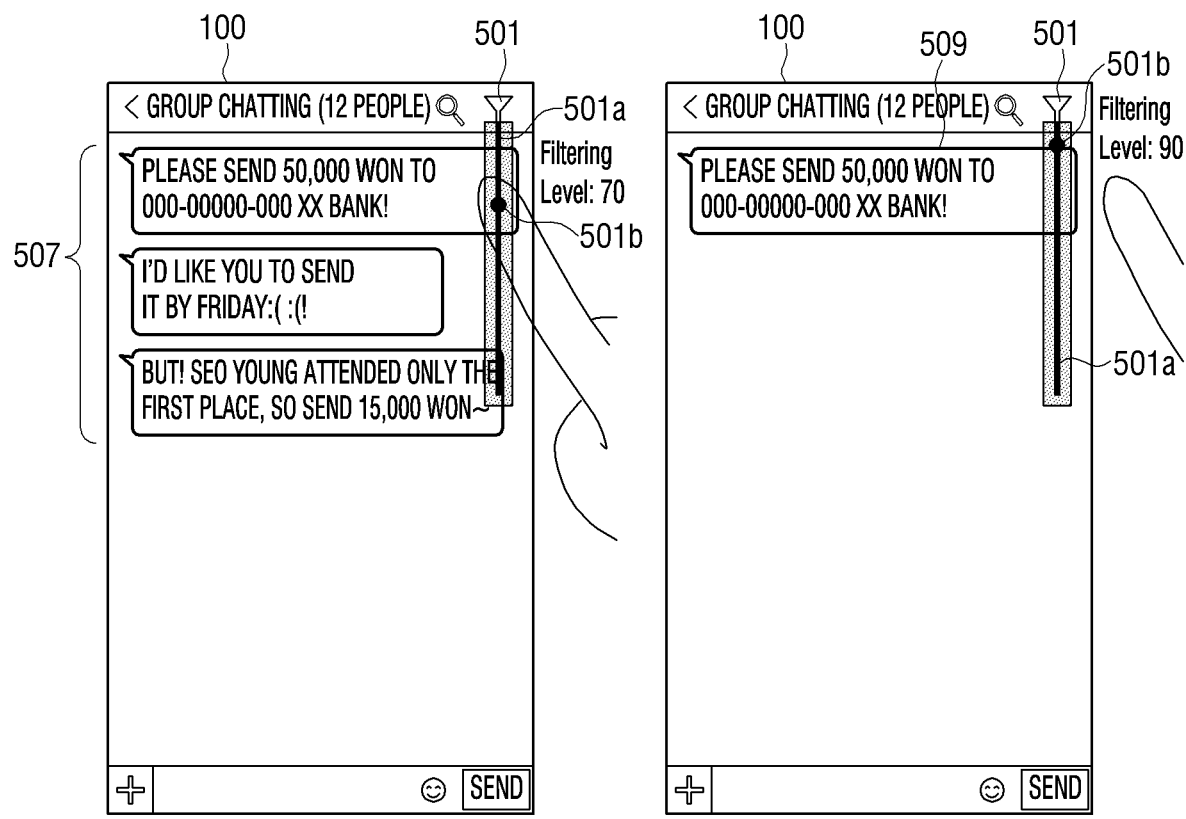

FIGS. 5A and 5B are diagrams illustrating use examples of an electronic apparatus 100 of filtering messages according to another example embodiment of the present disclosure.

Referring to FIG. 5A, the display 220 may display at least some 503 of a plurality of messages that the user has talked with the third party in the chatting room, on the screen.

In this case, the user input unit 230 may receive a user input that selects a filtering UI 501 for filtering the plurality of messages.

In response to the user input, as illustrated in FIG. 5A, the display 220 may display a filtering bar 501a and an indicator 501b positioned on the filtering bar 501a.

In this case, a position of the indicator 501b on the filtering bar 501a may correspond to one level of a plurality of filtering levels. For example, the plurality of filtering levels may correspond to the percentiles determined by the importance determiner 330 of FIG. 3, and the one level corresponding to the position of the indicator 501b on the filtering bar 501a may correspond to one value of the percentile.

For example, as illustrated in FIG. 5A, in a case in which the indicator 501b on the filtering bar 501a is positioned at the lowest portion of the filtering bar 501, the filtering level corresponding to the position of the indicator 501b may be a level 0.

One or more messages having the importance that satisfying the level 0 may be messages having the importance 0% or more, which is one value of the percentile, as the importance that corresponds to the level 0. In this case, the messages having the importance of the percentile of 0% or more may be the entirety of the plurality of messages.

The processor 210 may control the display 220 so that one or more messages 505 having the importance that satisfies the level 0 is displayed on the screen.

Meanwhile, in a case in which all of the plurality of messages may not be displayed on the screen, the display 220 may display only some of the plurality of messages, and may continuously display other messages which are not displayed on the screen among the plurality of messages on the screen in response to the input of the user (e.g., a touch drag gesture, etc.).

According to various example embodiments, the user input unit 230 may receive a user input that moves the position of the indicator 501b positioned on the filtering bar 501a to another position.

Accordingly, as illustrated in FIG. 5B, the indicator 501b on the filtering bar 501a may be upwardly moved. A filtering level corresponding to the position of the moved indicator 501b may be a level 70.

One or more messages having the importance that satisfying the level 70 may be messages having the importance of 70% or more, which is one value of the percentile, as the importance that corresponds to the level 70. For example, for the messages of FIG. 4C, the messages having the importance of 70% or more may be a message #9, a message #4, and a message #8.

The processor 210 may obtain one or more messages 507 having the importance that satisfies the level 70 and control the display 220 so that the obtained one or more messages 507 is displayed on the screen.

As another example, the user input unit 230 may receive a user input that moves the position of the indicator 501b positioned on the filtering bar 501a to still another position.

Accordingly, as illustrated in FIG. 5B, the indicator 501b on the filtering bar 501a may be further upwardly moved. In this case, a filtering level corresponding to the position of the moved indicator 501b may be a level 90.

One or more messages having the importance that satisfying the level 90 may be messages having the importance of 90% or more, which is one value of the percentile, as the importance that corresponds to the level 90. For example, for the messages of FIG. 4C, the messages having the importance of 90% or more may be a message #9.

The processor 210 may obtain one or more messages 509 having the importance that satisfies the level 90 and control the display 220 so that the obtained one or more messages 509 is displayed on the screen.

FIGS. 6A and 6B are diagrams illustrating use examples of an electronic apparatus 100 of filtering messages according to another example embodiment of the present disclosure.

Referring to FIG. 6A, the display 220 may display at least some 605 of a plurality of comments for contents 603 provided from a social network service (SNS) service on the screen. In this case, the contents may include, for example, images, moving images, texts, or audios, but are not limited thereto. Further, the comments may correspond to the messages according to the present disclosure. Further, the entirety of the plurality of comments for the contents 603 may be the plurality of messages according to the present disclosure.

In this case, the user input unit 230 may receive a user input that selects a filtering UI 601 for filtering the plurality of comments.

In response to the user input, as illustrated in FIG. 6B, the display 220 may provide a plurality of filtering buttons (e.g., a check buttons of a star shape or a circle shape) 601a. In this case, the plurality of filtering buttons 601a may correspond to a plurality of preset filtering levels, respectively.

In this case, the user input unit 230 may receive a user input that selects one filtering button 601a-1 of the plurality of filtering buttons 601a.

In response to the user input, the processor 210 may obtain one or more comments 607 having the importance that satisfies the filtering level corresponding to one filtering button, and control the display 220 so that the obtained one or more comments 607 are displayed on the screen.

For example, when the entirety of the plurality of filtering buttons 601a are not activated, the comments corresponding to the filtering level may be the comments having the importance of the percentile of 0% or more, and when the entirety of the plurality of filtering buttons 601a are activated, the comments corresponding to the filtering level may be the comments having the importance of the percentile of 90% or more. In this case, the filtering level corresponding to the selected one filtering button 601*a*-1 may be the comments having the importance of the percentile of 60% or more.

FIGS. 7A and 7B are diagrams illustrating use examples of an electronic apparatus 100 of filtering messages according to another example embodiment of the present disclosure.

Referring to FIG. 7A, the processor 210 may display at least some 703 of emails provided from an email box on the screen. In this case, at least one of a body and a title of the email may correspond to the message according to the present disclosure. Further, the entirety of sent or received emails stored in the email box may be the plurality of messages according to the present disclosure. Emails which are sent or received during a predetermined period among the emails stored in the email box may be the plurality of messages according to the present disclosure.

In this case, the user input unit 230 may receive a user input that selects a filtering UI 701 for filtering the plurality of emails.

In response to the user input, as illustrated in FIG. 7B, the display 220 may display a filtering bar 701*a* and an indicator 701*b* positioned on the filtering bar 701*a*.

In this case, the electronic apparatus 100 may receive a user input that selects the position of the indicator 701*b* positioned on the filtering bar 701*a*.

In response to the user input, the processor 210 may obtain one or more emails 705 having the importance that satisfies the filtering level corresponding to the position of the indicator 701*b*, and control the display 220 so that the obtained one or more emails 705 are displayed on the screen.

For example, when the indicator 701*b* is positioned at the leftmost portion of the filtering bar 701*a*, the emails corresponding to the filtering level may be the emails having the importance of the percentile of 0% or more, and when the indicator 701*b* is positioned at the rightmost portion of the filtering bar 701*a*, the emails corresponding to the filtering level may be the emails having the importance of the percentile of 90% or more. In this case, in FIG. 7B, the filtering level corresponding to the position of the selected indicator 701*b* may be the emails having the importance of the percentile of 80% or more.

The present disclosure presents the filtering bar, the indicator, and the plurality of filtering buttons, as the UIs for filtering the plurality of messages, but the UIs are not limited to the above-mentioned examples and the UI for filtering the plurality of messages may be implemented in various ways.

As such, as the number of the messages displayed on the screen based on the importance may be adjusted, the user may quickly retrieve desired messages and exclude meaningless messages. That is, as only key messages having a high importance are displayed as the filtering level is higher and messages having a low importance are displayed together as the filtering level is lower, the user may quickly retrieve desired information from the messages.

Figure 8:
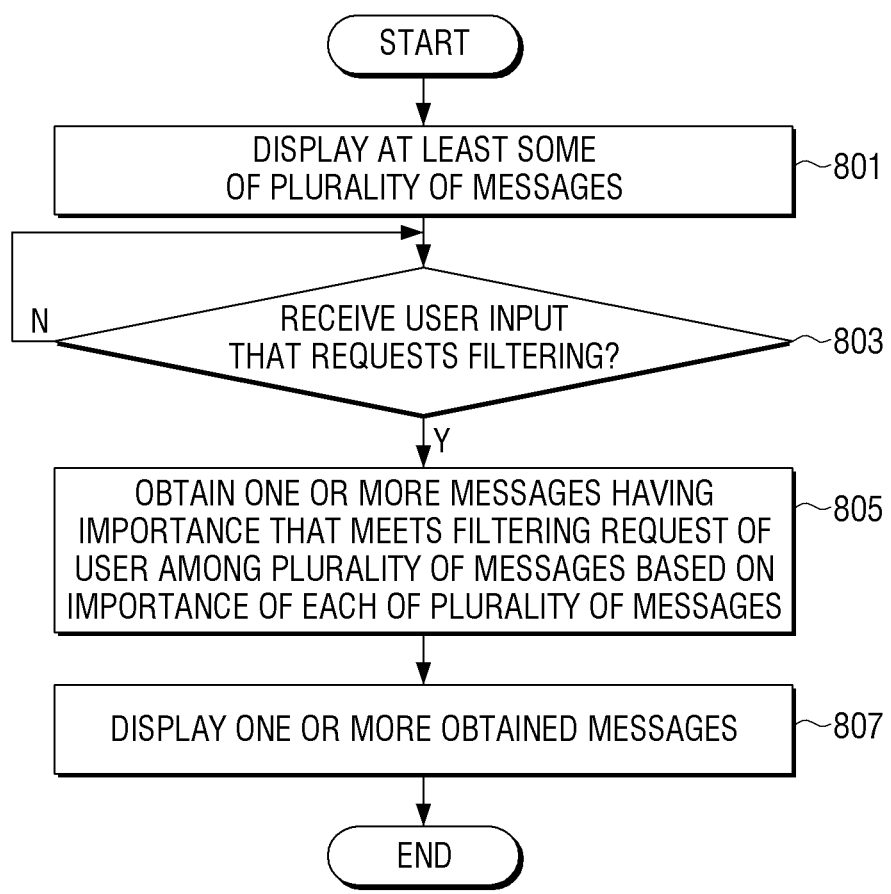
FIGS. 8, 9 and 10 are flowcharts illustrating an example operation of the electronic apparatus according to an example embodiment of the present disclosure.

FIG. 8 is a flowchart illustrating an example operation of electronic apparatus 100 according to an example embodiment of the present disclosure.

In FIG. 8, the electronic apparatus 100 may display at least some of the plurality of messages (801).

The electronic apparatus 100 may determine whether or not a user input that requests the filtering of the plurality of messages is received (803).

If the user input is received (Yes in 803), the electronic apparatus 100 may obtain one or more messages having importance that meets the filtering request of the user, from among the plurality of messages, based on importance of each of the plurality of messages (805).

The electronic apparatus 100 may display the one or more obtained messages (807).

According to various example embodiments, when the electronic apparatus 100 obtains the one or more messages, the electronic apparatus 100 may obtain one or more messages having the importance that satisfies the selected filtering level from among the plurality of messages based on the importance of each of the plurality of messages.

Further, when the electronic apparatus 100 obtains the one or more messages, the electronic apparatus 100 may obtain one or more messages having the importance which is greater than or equal to the selected filtering level from among the plurality of messages based on the importance of each of the plurality of messages.

Further, when the electronic apparatus 100 obtains the one or more messages, the electronic apparatus 100 may calculate message scores of each of the plurality of messages.

Further, when the electronic apparatus 100 obtains the one or more messages, the electronic apparatus 100 may determine an importance of each of the plurality of messages based on the calculated score of each of the plurality of messages.

Figure 9:
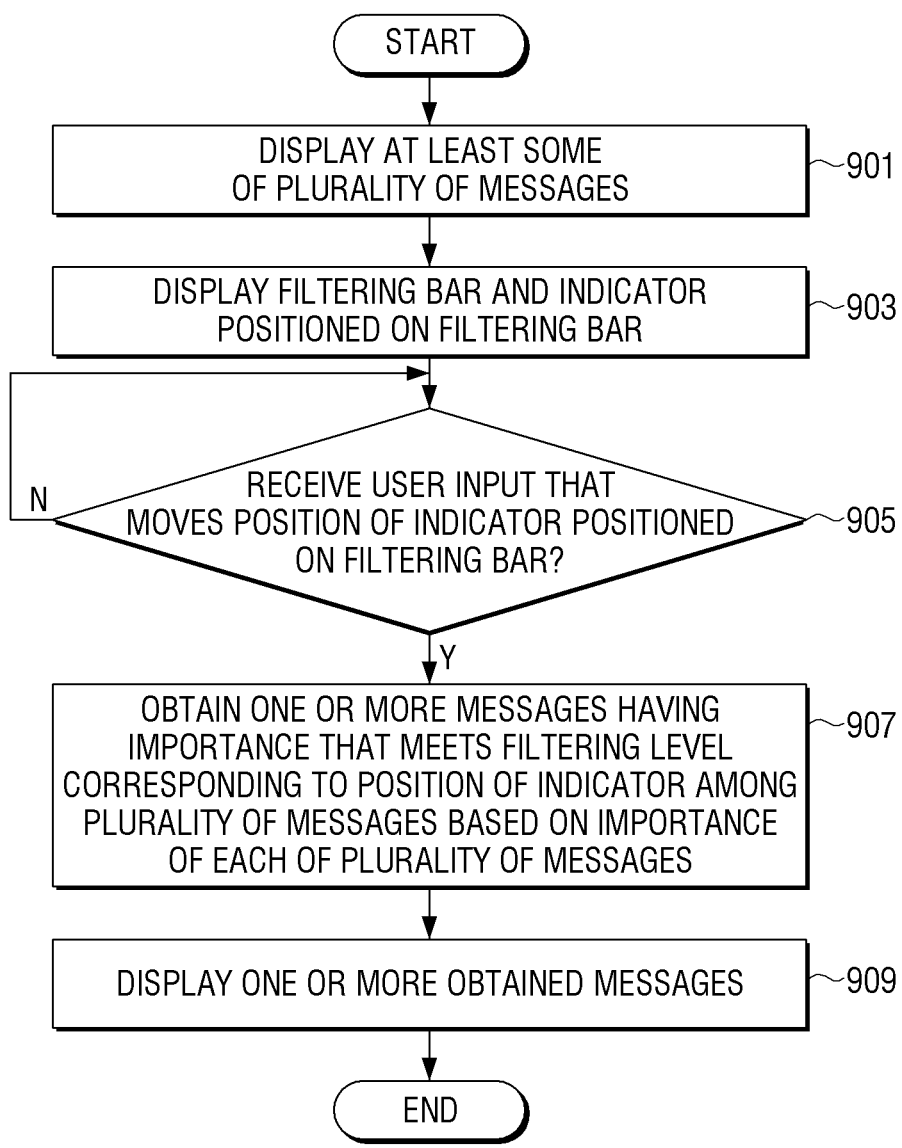

FIG. 9 is a flowchart illustrating an example operation of the electronic apparatus 100 according to another example embodiment of the present disclosure.

In FIG. 9, the electronic apparatus 100 may display at least some of the plurality of messages (901).

Further, the electronic apparatus 100 may display a filtering bar and an indicator positioned on the filtering bar (903). In this case, the filtering bar and the indicator may be displayed in response to a user input that requests the filtering.

The electronic apparatus 100 may determine whether or not a user input that moves a position of the indicator positioned on the filtering bar is received (905).

If the user input is received (Yes in 905), the electronic apparatus 100 may obtain one or more messages having importance that meets the filtering level corresponding to the position of the indicator from among the plurality of messages, based on importance of each of the plurality of messages (907).

The electronic apparatus 100 may display the one or more obtained messages (909).

Figure 10:
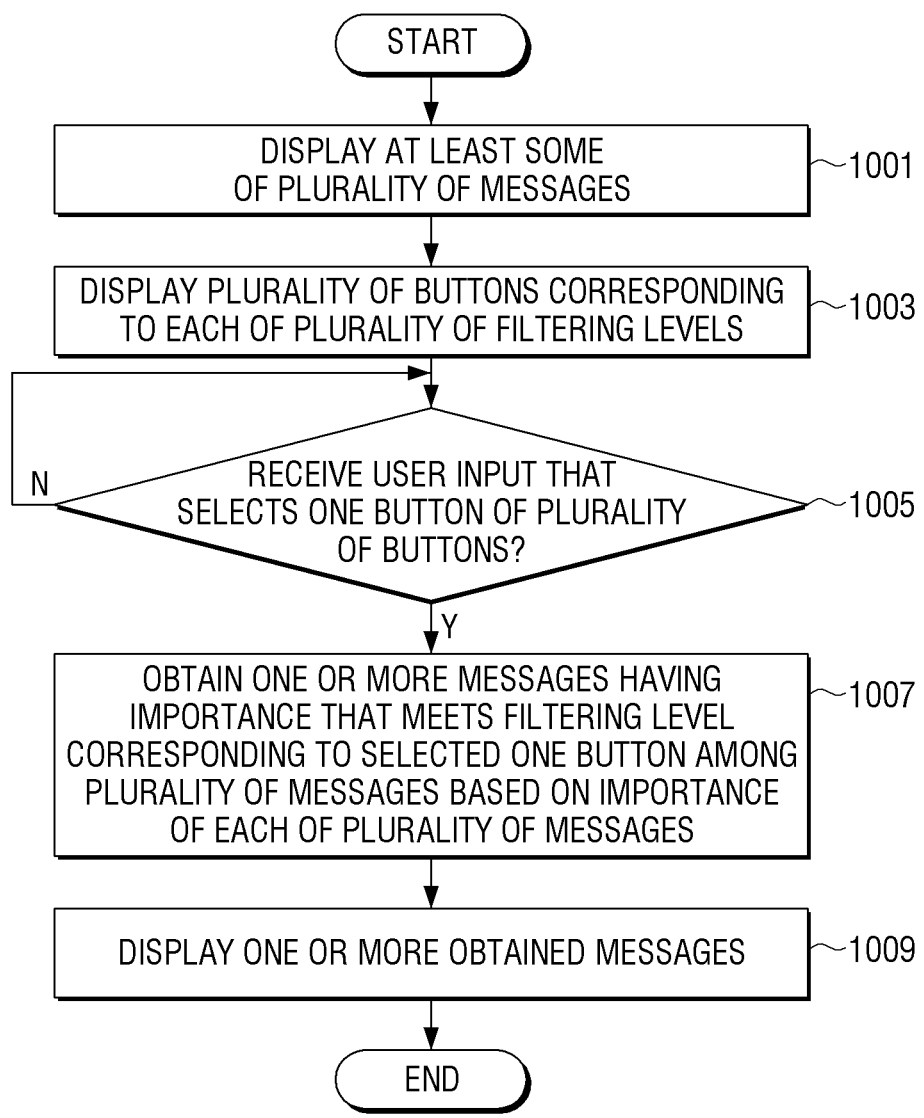

FIG. 10 is a flowchart illustrating an example operation of the electronic apparatus 100 according to still another example embodiment of the present disclosure.

In FIG. 10, the electronic apparatus 100 may display at least some of the plurality of messages (1001).

Further, the electronic apparatus 100 may display a plurality of buttons that correspond to each of a plurality of filtering levels (1003). In this case, the plurality of buttons may be displayed in response to a user input that requests the filtering.

The electronic apparatus 100 may determine whether or not a user input that selects one button of the plurality of buttons is received (1005).

If the user input is received (Yes in 1005), the electronic apparatus 100 may obtain one or more messages having importance that meets the filtering level corresponding to the one selected button from among the plurality of messages, based on importance of each of the plurality of messages (1007).

The electronic apparatus 100 may display the one or more obtained messages (1009).

Figure 11:
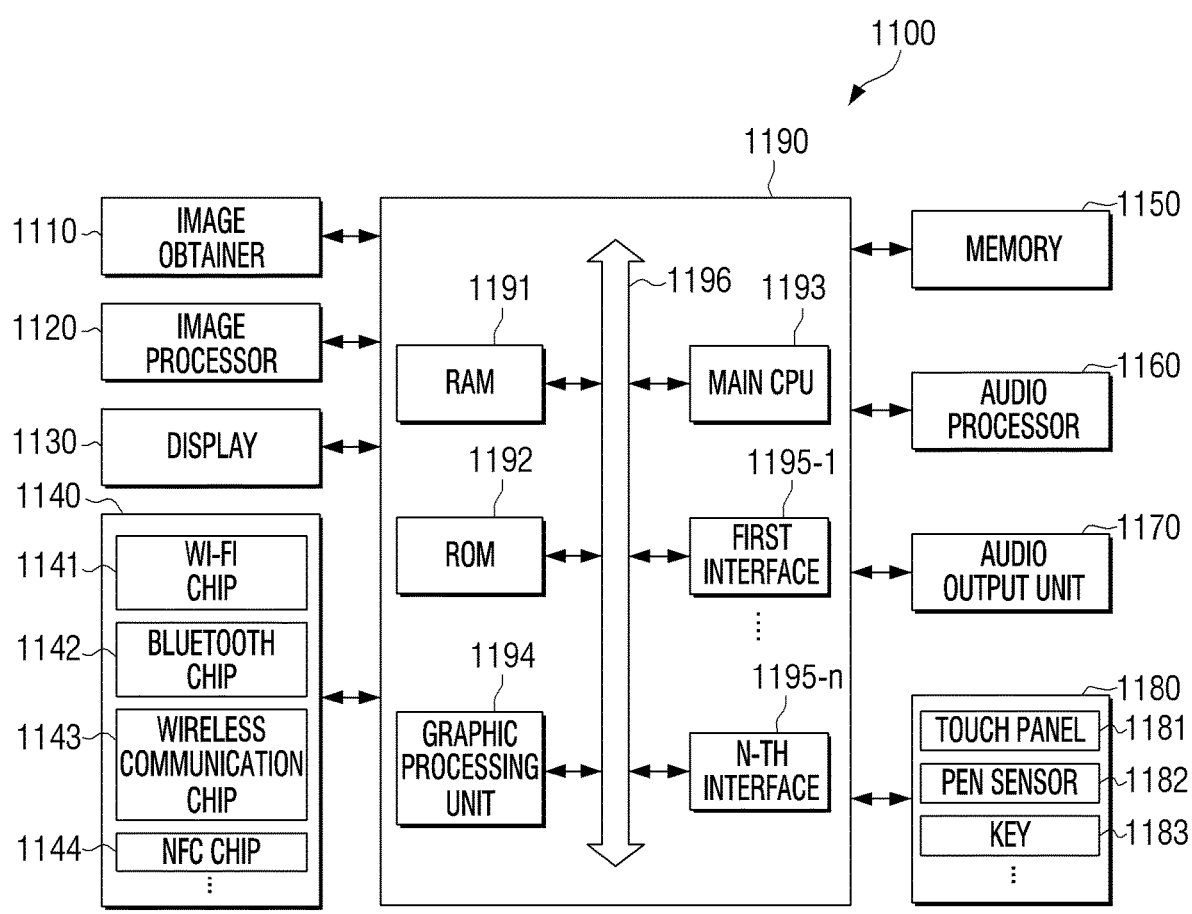
FIG. 11 is a block diagram illustrating an example configuration of an electronic apparatus according to an example embodiment of the present disclosure.

FIG. 11 is a block diagram illustrating an example configuration of an electronic apparatus according to various example embodiments of the present disclosure.

An electronic apparatus 1100 of FIG. 11 may be an example of the electronic apparatus 100 of FIG. 1 and may include the components of the electronic apparatus 100 of FIG. 1.

As illustrated in FIG. 11, the electronic apparatus 1100 may include at least one of an image obtainer (e.g., including image obtaining circuitry) 1110, an image processor (e.g., including image processing circuitry) 1120, a display 1130, a communicator (e.g., including communication circuitry) 1140, a memory 1150, an audio processor (e.g., including audio processing circuitry) 1160, an audio output unit (e.g., including audio output circuitry) 1170, a user input unit (e.g., including input circuitry) 1180, and a processor (e.g., including processing circuitry) 1190. Meanwhile, the configuration of the electronic apparatus 1100 illustrated in FIG. 11 is merely an example, and is not necessarily limited to the block diagram described above. Therefore, some of the configuration of the electronic apparatus 1100 illustrated in FIG. 11 may also be omitted, modified, or added depending on a kind of the electronic apparatus 1100 or a purpose of the electronic apparatus 1100.

The image obtainer 1110 may include various circuitry and obtain image data through various sources. For example, the image obtainer 1110 may receive the image data from an external server and receive the image data from an external device. The image obtainer 1110 may obtain the image data by photographing an external environment. For example, the image obtainer 1110 may be implemented as a camera that photographs the external environment of the electronic apparatus 1100. The image data obtained through the image obtainer 1110 may be processed by the image processor 1120.

The image processor 1120 may include various circuitry and perform a processing for the image data received from the image obtainer 1110. The image processor 1120 may perform various image processes such as decoding, scaling, noise filtering, frame rate converting, resolution converting, and the like for the image data.

The display 1130 may display the image data processed by the image processor 1120 on a display region. The display 730 may also be coupled to at least one of a front region, a side region, and a rear region of the electronic apparatus 1100 in a form of a flexible display. The flexible display may be bent, folded, or rolled without being damaged using a thin and flexible substrate such as a paper.

The display 1130 which is coupled to a touch panel 1181 may be implemented as a touch screen of a layer structure. The touch screen may have a function that detects a position of a touch input, a touched area, and pressure of the touch input as well as a display function, and may also have a function that detects a proximity touch as well as a real-touch.

The communicator 1140 may include various communication circuitry and perform communication with various types of external devices according to various types of communication schemes. The communicator 1140 may include various communication circuitry, such as, for example, and without limitation, at least one of a Wi-Fi chip 1141, a Bluetooth chip 1142, a wireless communication chip 1143, and a near field communications (NFC) chip 1144. The processor 1190 may perform communication with an external server or a variety of external devices using the communicator 1140.

The memory 1150 may store a variety of programs and data necessary to operate the electronic apparatus 1100. The memory 1150 may be implemented as a non-volatile memory, a volatile memory, a flash-memory, a hard disk drive (HDD), a solid state drive (SSD), or the like. The memory 1150 may be accessed by the processor 1190, where reading/recording/edition/deletion/updating, etc., of data by the processor 1190 may be performed. In the present disclosure, a term "memory" may include the memory 1150, read only memory (ROM) 1192 in the processor 1190, random access memory (RAM) 1191, or a memory card (not illustrated) (e.g., a micro SD card, a memory stick, or the like) mounted in the electronic apparatus 1100.

Further, the memory 1150 may store the program, the data, and the like for configuring a variety of screens to be displayed on the display region of the display 1130. Further, the memory 1150 may also store the data analysis model according to the present disclosure.

The audio processor 1160 is a component including various circuitry for performing a processing for audio data. The audio processor 1160 may perform various processes such as decoding, amplification, noise filtration, and the like for the audio data. The audio data processed by the audio processor 1160 may be output to the audio output unit 1170.

The audio output unit 1170 is a component that includes various circuitry and outputs a variety of alarm sounds or voice messages as well as a variety of audio data for which various processing tasks such as decoding, amplification, and noise filtration are performed by the audio processor 1160. For example, the audio output unit 1170 may be implemented as a speaker, but is merely an example. For example, the audio output unit 1170 may be implemented as an output terminal capable of outputting the audio data.

The user input unit 1180 may include various input circuitry and receive various user inputs and transmit the received user inputs to the processor 1190. The user input unit 1180 may include various input circuitry, such as, for example, and without limitation, one or more of a touch panel 1181, a (digital) pen sensor 1182 or a key 1183. The touch panel 1181 may use, for example, at least one type of a capacitive type, a resistive type, an infrared type, or an ultrasonic type. Further, the touch panel 1181 may further include a control circuit. The touch panel 1181 may further include a tactile layer to provide a tactile reaction to the user. The (digital) pen sensor 1182 may be, for example, and without limitation, a portion of the touch panel, or may include a separate recognition sheet. The key 1183 may include, for example, and without limitation, a physical button, an optical key, or a key pad.

The processor 1190 (or the controller) may include various processing circuitry and control an overall operation of the electronic apparatus 1100 using a variety of programs stored in the memory 1150.

The processor 1190 may include, for example, and without limitation, a random access memory (RAM) 1191, a read only memory (ROM) 1192, a graphic processing unit 1194, a main central processing unit (CPU) 1193, first to n-th interfaces 1195-1 to 1195-n, and a bus 1196. Here, the RAM 1191, the ROM 1192, the graphic processing unit 1194, the main CPU 1193, the first to n-th interfaces 1195-1 to 1195-n, and the like may be connected to each other through the bus 1196.

According to various example embodiments, the display 1130 may display at least some of the plurality of messages. The user input unit 1180 may receive a user input that requests the filtering of the plurality of messages. In response to the received user input, the processor 1190 may obtain one or more messages having importance that meets the filtering request of the user, among the plurality of messages based on importance of each of the plurality of messages. In addition, the processor 1190 may control the display 1130 to display the one or more obtained messages.

Hereinafter, an example embodiment of analyzing an importance of a message using the data analysis model will be described in greater detail below with reference to FIGS. 12 to 15.

Figure 12:
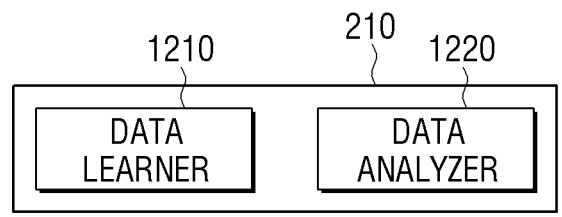
FIGS. 12, 13, 14 and 15 are diagrams illustrating example embodiments in which a data analysis model is built through a learning algorithm to recognize data, according to various example embodiments of the present disclosure.

Referring to FIG. 12, the processor 210 according to some example embodiments may include a data learner (e.g., including processing circuitry and/or program elements) 1210 and a data analyzer (e.g., including processing circuitry and/or program elements) 1220.

The data learner 1210 may generate or learn the data analysis model so that the data analysis mode has a reference for a predetermined situation determination (e.g., an importance analysis of a message, etc.). The data learner 1210 may generate a data recognition model having a determination reference by applying learning data to the data recognition model to determine a predetermined situation.

As an example, the data learner 1210 according to an example embodiment of the present disclosure may obtain data for the message as the learning data, and may generate, learn or update the data recognition model having the determination reference using the obtained data.

The data for the message may include, for example, at least one of a text, an image, a moving image, and an audio which are included in the message. Further, the data for the message may be, for example, the message itself obtained by the electronic apparatus 100, the result of the preprocessing of the message by the preprocessor 310 of FIG. 3 or the score of the message by the score calculator 320 of FIG. 3.

The data analyzer 1220 may determine a situation based on the analysis data. In particular, the data analyzer 1220 may determine the importance of a predetermined message by using the data for the message as the analysis data using the learned data analysis model.

For example, the data analyzer 1220 may determine (or judge or estimate) the importance for the message by obtaining the data for the predetermined message according to the reference which is preset by the learning, and applying the obtained data for the message to the data analysis model as an input value. Further, a result value which is output by the data analysis model by applying the obtained data for the message to the data analysis model as the input value may be used to update the data analysis model. For example, the data analyzer 1220 according to an example embodiment of the present disclosure may obtain a determination result (e.g., the importance of the message) obtained by determining the situation of the electronic apparatus 100, by applying the data (e.g., the text, the image, the moving image, the audio, etc.) for the message to the learned data analysis model as the input value.

At least a portion of the data learner 1210 and at least a portion of the data analyzer 1220 may be implemented in a software module or manufactured in a form of at least one hardware chip, and may be mounted in the electronic apparatus. For example, at least one of the data learner 1210 and the data analyzer 1220 may also be manufactured in a form of a dedicated hardware chip for artificial intelligence (AI), or manufactured in a portion of the conventional general-purpose processor (e.g., CPU or application processor) or graphic dedicated processor (e.g., GPU), and may be mounted in the variety of electronic apparatuses described above. Here, since the dedicated hardware chip for AI, which is a dedicated processor specialized in probability operation, has higher parallel processing performance than the conventional general-purpose processor, it may quickly process an operation task of an AI field such as a machine learning. In a case in which the data learner 1210 and the data analyzer 1220 are implemented in a software module (or a program module including instructions), the software module may be stored in a non-transitory computer readable medium. In this case, the software module may be provided by an operating system (OS), or provided by a predetermined application. Some of the software module may be provided by the operating system (OS), and the remaining some thereof may be provided by the predetermined application.

In this case, the data learner 1210 and the data analyzer 1220 may also be mounted in one electronic apparatus, or may also be each mounted in separate electronic apparatuses. For example, one of the data learner 1210 and the data analyzer 1220 may be included in the electronic apparatus 100, and the other thereof may be included in the external server. Further, the data learner 1210 and the data analyzer 1220 may also provide the model information which is built by the data learner 1210 to the data analyzer 1220 in a wired or wireless scheme, and the data which is input to the data analyzer 1220 may also be provided to the data learner 1210 as additional learning data.

Figure 13:
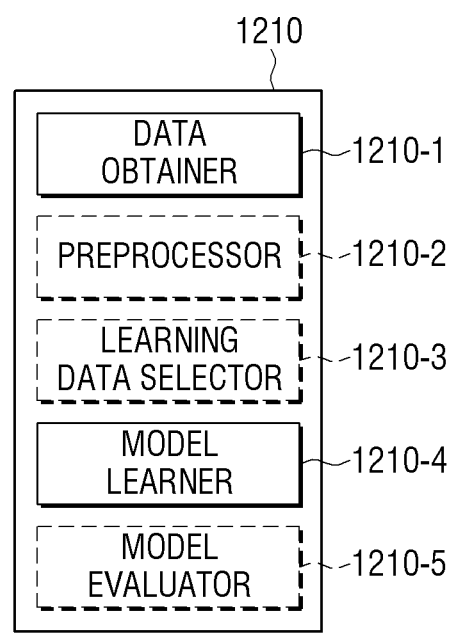

FIG. 13 is a block diagram illustrating an example of the data learner 1210 according to some example embodiments of the present disclosure.

Referring to FIG. 13, the data learner 1210 according to some example embodiments may include a data obtainer (e.g., including processing circuitry and/or program elements) 1210-1 and a model learner (e.g., including processing circuitry and/or program elements) 1210-4. Further, the data learner 1210 may selectively further include at least one of a preprocessor (e.g., including processing circuitry and/or program elements) 1210-2, a learning data selector (e.g., including processing circuitry and/or program elements) 1210-3, and a model evaluator (e.g., including processing circuitry and/or program elements) 1210-5.

The data obtainer 1210-1 may obtain learning data necessary for learning for the situation determination. According to an example embodiment of the present disclosure, the data obtainer 1210-1 may obtain the data for the message (e.g., the text, the image, the moving image, the audio, etc. included in the message) as the learning data.

The learning data may also be data for the message which is collected or tested by the data learner 1210 or the manufacturer of the electronic apparatus 100. The learning data may also be data for the message received by the electronic apparatus 100.

The model learner 1210-4 may learn the data analysis model using the learning data so that the data analysis model has a determination reference as to how to determine a predetermined situation. For example, the model learner 1210-4 may learn the data analysis model through a supervised learning that uses at least some of the learning data as the determination reference. The model learner 1210-4 may learn the data analysis model through an unsupervised learning that finds the determination reference for determining the situation by learning itself using the learning data without any supervision.

Further, the model learner 1210-4 may also learn a selection reference to which learning data needs to be used for the situation determination. For example, the model learner 1210-4 according to an example embodiment of the present disclosure may learn the data analysis model by using the data for the input message as the learning data. In this case, the data analysis model may be a model which is previously built. For example, the data analysis model may be a model which is previously built by receiving basic learning data (e.g., a sample message or the like).

The data analysis model may be built by considering an application field of a recognition model, a learning purpose, computer performance of the device, or the like. The data analysis model may be, for example, a neural network based model. The data recognition model may be designed to mimic a brain structure of human on a computer. The data recognition model may include a plurality of network nodes having weight values that mimic neurons of the neural network of human. The plurality of network nodes may each form connection relationship to mimic a synaptic activity of the neuron that transmits and receives signals through a synapse. The data recognition model may include, for example, a neural network model, or a deep learning model developed from the neural network model. The plurality of network nodes in the deep learning model may transmit and receive data according to a convolution connection relationship while being positioned at different depths (or layers).

For example, models such as DNN (Deep Neural Network), RNN (Recurrent Neural Network), and BRDNN (Bidirectional Recurrent Deep Neural Network) may be used as the data analysis model, but the data analysis model is not limited thereto.

According to various example embodiments, when there are a plurality of data analysis models which are previously built, the model learner 1210-4 may determine an analysis model having high relevance between the input learning data and the basic learning data as the data analysis model to be learned. In this case, the basic learning data may be pre-classified for each of types of data and the data analysis model may be previously built for each of the types of the data. For example, the basic learning data may be pre-classified based on various references such as a region in which the learning data is generated, a time at which the learning data is generated, a size of the learning data, a genre of the learning data, a generator of the learning data, a kind of object in the learning data, and the like.

Further, the model learner 1210-4 may learn the data analysis model using a learning algorithm including, for example, error back-propagation or gradient descent.

Once the data analysis model is learned, the model learner 1210-4 may store the learned data analysis model. In this case, the model learner 1210-4 may store the learned data analysis model in the memory 240 of the electronic apparatus 100. The model learner 1210-4 may store the learned data analysis model in the memory of the server which is connected to the electronic apparatus 100 through a wired or wireless network.

The data learner 1210 may further include a preprocessor 1210-2 and a learning data selector 1210-3 to improve the analysis result of the data analysis model or to save resources or time required to generate the data analysis model.

The preprocessor 1210-2 may preprocess the obtained data so that the obtained data may be used for learning for the situation determination. The preprocessor 1210-2 may process the obtained data into a preset format so that a model learner 1210-4 to be described below may use the obtained data for learning for the situation determination.

According to an example embodiment of the present disclosure, the preprocessor 1210-2 may perform preprocesses such as a morpheme analysis, an entity extraction, a letter symbol removal, an analogous term extraction, and a template matching for text data included in the message. The preprocessor 1210-2 may correspond to, for example, at least a portion of the preprocessor 310 of FIG. 3.

The learning data selector 1210-3 may select data necessary for learning among the data obtained by the data obtainer 1210-1 or the data preprocessed by the preprocessor 1210-2. The selected learning data may be provided to the model learner 1210-4. The learning data selector 1210-3 may select the learning data necessary for learning among obtained or preprocessed data, according to a preset selection reference. Further, the learning data selector 1210-3 may also select the learning data according a selection reference which is preset by the learning by the model learner 1210-4.

According to an example embodiment of the present disclosure, the learning data selector 1210-3 may select only data for the message which is received from a specific origin, is received during a specific period, or is managed by a specific application. The learning data selector 1210-3 may select at least one of results of the morpheme analysis, the entity extraction, the letter symbol removal, the analogous term extraction, and the template matching, which are results performed by the preprocessor 1210-2, which are results performed by the preprocessor 1210-2, as the learning data.

However, the learning data selector 1210-3 is an optional configuration, and may also be omitted according to the example embodiment of the present disclosure.

The data learner 1210 may further include a model evaluator 1210-5 to improve the analysis result of the data recognition model.

The model evaluator 1210-5 may input evaluation data to the data analysis model, and may cause the model learner 1210-4 to again learn when the analysis result which is output from the evaluation result does not meet a predetermined reference. In this case, the evaluation data may be predefined data for evaluating the data analysis model.

For example, the model evaluator 1210-5 may evaluate that the evaluation result does not meet the predetermined reference when the number or ratio of evaluation data for which the analysis result is not correct exceeds a predetermined threshold value, among the analysis result of the learned data analysis model for the evaluation data. For example, in a case in which the predetermined reference is defined as a ratio of 2%, when the learned data analysis model outputs an incorrect analysis result for the evaluation data that exceeds 20 among the evaluation data of a total of 1000, the model evaluator 1210-5 may evaluate that the learned data analysis model is not appropriate.

Meanwhile, when there are a plurality of learned data analysis models, the model evaluator 1210-5 may evaluate whether or not each of the learned data analysis models meets a predetermined reference, and determine the model that meets the predetermined reference as a final data analysis model. In this case, when there are a plurality of models that meet the predetermined reference, the model evaluator 1210-5 may determine any one or a predetermined number of models which are preset in a descending order of an evaluation score as the final data analysis model.

At least one of the data obtainer 1210-1, the preprocessor 1210-2, the learning data selector 1210-3, the model learner 1210-4, and the model evaluator 1210-5 described above may be implemented in a software module or manufactured in a form of at least one hardware chip, and may be mounted in the electronic apparatus. For example, at least one of the data obtainer 1210-1, the preprocessor 1210-2, the learning data selector 1210-3, the model learner 1210-4, and the model evaluator 1210-5 may also be manufactured in a form of a dedicated hardware chip for artificial intelligence (AI), or manufactured in a portion of the conventional general-purpose processor (e.g., CPU or application processor) or graphic dedicated processor (e.g., GPU), and may be mounted in the variety of electronic apparatuses described above.

Further, the data obtainer 1210-1, the preprocessor 1210-2, the learning data selector 1210-3, the model learner 1210-4, and the model evaluator 1210-5 may also be mounted in one electronic apparatus, or may also be each mounted in separate electronic apparatuses. For example, some of the data obtainer 1210-1, the preprocessor 1210-2, the learning data selector 1210-3, the model learner 1210-4, and the model evaluator 1210-5 may be included in the electronic apparatus, and the remaining thereof may be included in the server.

Further, at least one of the data obtainer 1210-1, the preprocessor 1210-2, the learning data selector 1210-3, the model learner 1210-4, and the model evaluator 1210-5 may be implemented in a software module. In a case in which at least one of the data obtainer 1210-1, the preprocessor 1210-2, the learning data selector 1210-3, the model learner 1210-4, and the model evaluator 1210-5 is implemented in the software module (or a program module including instructions), the software module may be stored in a non-transitory computer readable medium. Further, in this case, at least one software module may be provided by an operating system (OS), or provided by a predetermined application. A portion of the at least one software module may be provided by the operating system (OS), and the remaining some thereof may be provided by the predetermined application.

Figure 14:
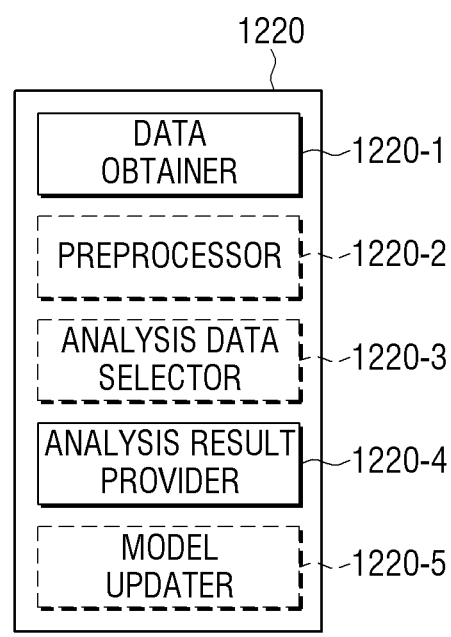

FIG. 14 is a block diagram illustrating an example of the data analyzer 1220 according to various example embodiments.

Referring to FIG. 14, the data analyzer 1220 according to various example embodiments may include a data obtainer (e.g., including processing circuitry and/or program elements) 1220-1 and an analysis result provider (e.g., including processing circuitry and/or program elements) 1220-4. Further, the data analyzer 1220 may selectively further include at least one of a preprocessor (e.g., including processing circuitry and/or program elements) 1220-2, an analysis data selector (e.g., including processing circuitry and/or program elements) 1220-3, and a model updater (e.g., including processing circuitry and/or program elements) 1220-5.

The data obtainer 1220-1 may obtain data necessary for situation determination.

The analysis result provider 1220-4 may determine the situation by applying the data obtained by the data obtainer 1220-1 to the learned data analysis model as an input value. The analysis result provider 1220-4 may provide an analysis result according to an analysis purpose of the data. The analysis result provider 1220-4 may obtain the analysis result by applying the data selected by the preprocessor 1220-2 or the analysis data selector 1220-3 to be described below to the data analysis model as the input value. The analysis result may be determined by the data analysis model.

According to an example embodiment of the present disclosure, the analysis result provider 1220-4 may obtain the importance of the message by applying the data for the message obtained by the data obtainer 1220-1 to the data analysis model. The data for the message may include, for example, at least one of a text, an image, a moving image, and an audio which are included in the message.

In this case, the analysis result provider 1220-4 may determine the importance of the plurality of messages by applying the data for each of the plurality of messages to the data analysis model. The analysis result provider 1220-4 may determine a relative priority of the plurality of messages by applying the data for each of the plurality of messages to the data analysis model. For example, the analysis result provider 1220-4 may also determine a ranking or a percentile between the plurality of messages as the analysis result.

The data analyzer 1220 may further include a preprocessor 1220-2 and an analysis data selector 1220-3 to improve the analysis result of the data analysis model or to save resources or time for providing the analysis result.

The preprocessor 1220-2 may preprocess the obtained data so that the obtained data may be used for the situation determination. The preprocessor 1220-2 may process the obtained data into a predefined format so that the analysis result provider 1220-4 may use the obtained data for the situation determination.

For example, according to an example embodiment of the present disclosure, the data obtainer 1220-1 may obtain the data for the message, and the preprocessor 1220-2 may preprocess the data for the message into the predefined format, as described above. For example, the preprocessor 1220-2 may perform preprocesses such as a morpheme analysis, an entity extraction, a letter symbol removal, an analogous term extraction, and a template matching for text data included in the message. The preprocessor 1220-2 may correspond to, for example, at least a portion of the preprocessor 310 of FIG. 3.

The analysis data selector 1220-3 may select data necessary for the situation determination among the data obtained by the data obtainer 1220-1 or the data preprocessed by the preprocessor 1220-2. The selected data may be provided to the analysis result provider 1220-4. The analysis data selector 1220-3 may select some or all of the obtained or preprocessed data, according to a preset selection reference for the situation determination. Further, the analysis data selector 1220-3 may also select the data according to a selection reference which is preset by the learning by the model learner 1210-4.

According to an example embodiment of the present disclosure, the analysis data selector 1220-3 may select only data for the message which is received from a specific origin, is received during a specific period, or is managed by a specific application. The analysis data selector 1220-3 may select at least one of results of the morpheme analysis, the entity extraction, the letter symbol removal, the analogous term extraction, and the template matching, which are results performed by the preprocessor 1220-2, as the learning data.

For example, the analysis data selector 1220-3 may select the data for each of the messages that the user has talked with the third party in a specific chatting room as the data necessary for the situation determination (e.g., the importance of the message) as illustrated in FIG. 1.

The analysis data selector 1220-3 may select data for each of the plurality of comments for specific contents as the data necessary for the situation determination, as illustrated in FIG. 6.

The analysis data selector 1220-3 may select data for each of the emails included in the inbox of a specific application (e.g., an email application) as the data necessary for the situation determination, as illustrated in FIG. 7. Here, the emails which are transmitted or received during a predetermined period may also be selected as the data for the situation determination.

The model updater 1220-5 may perform a control so that the data analysis model is updated, based on the analysis result provided by the analysis result provider 1220-4. For example, the model updater 1220-5 may perform a control so that the model learner 1210-4 updates the data analysis model by providing the analysis result provided by the analysis result provider 1220-4 to the model learner 1210-4.

At least one of the data obtainer 1220-1, the preprocessor 1210-2, the analysis data selector 1220-3, the model result provider 1220-4, and the model updater 1220-5 in the data analyzer 1220 described above may be implemented in a software module or manufactured in a form of at least one hardware chip, and may be mounted in the electronic apparatus. For example, at least one of the data obtainer 1220-1, the preprocessor 1220-2, the analysis data selector 1220-3, the analysis result provider 1220-4, and the model updater 1220-5 may also be manufactured in a form of a dedicated hardware chip for artificial intelligence (AI), or manufactured in a portion of the conventional general-purpose processor (e.g., CPU or application processor) or graphic dedicated processor (e.g., GPU), and may be mounted in the variety of electronic apparatuses described above.

Further, the data obtainer 1220-1, the preprocessor 1220-2, the analysis data selector 1220-3, the analysis result provider 1220-4, and the model updater 1220-5 may also be mounted in one electronic apparatus, or may also be each mounted in separate electronic apparatuses. For example, some of the data obtainer 1220-1, the preprocessor 1220-2, the analysis data selector 1220-3, the analysis result provider 1220-4, and the model updater 1220-5 may be included in the electronic apparatus, and the remaining thereof may be included in the server.

Further, at least one of the data obtainer 1220-1, the preprocessor 1220-2, the analysis data selector 1220-3, the analysis result provider 1220-4, and the model updater 1220-5 may be implemented in a software module. In a case in which at least one of the data obtainer 1220-1, the preprocessor 1220-2, the analysis data selector 1220-3, the analysis result provider 1220-4, and the model updater 1220-5 is implemented in the software module (or a program module including instructions), the software module may be stored in a non-transitory computer readable medium. Further, in this case, at least one software module may be provided by an operating system (OS), or provided by a predetermined application. A portion of the at least one software module may be provided by the operating system (OS), and the remaining some thereof may be provided by the predetermined application.

Figure 15:
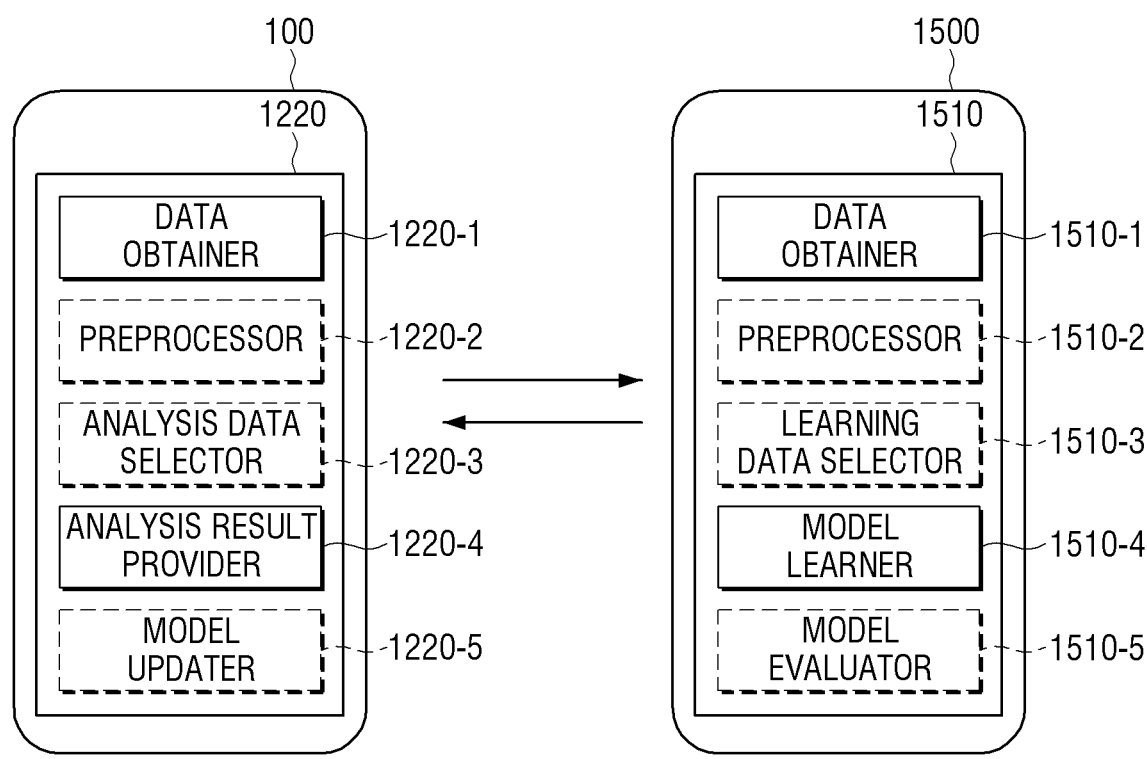

FIG. 15 is a diagram illustrating an example in which the electronic apparatus 100 and a server 1500 learn and recognize data by interfacing with each other, according to some example embodiments.

Referring to FIG. 15, the server 1500 may learn a reference for a situation determination, and the electronic apparatus 100 may determine the situation based on the learning result by the server 1500. The server 1500 may include a data obtainer 1510-1, a preprocessor 1510-2, a learning data selector 1510-3, a model learner 1510-4 and a model evaluator 1510-5 which may have the same or similar functions as described above with respect to like named elements discussed in detail with reference to FIG. 13.

In this case, a model learner 1510-4 of the server 1500 may perform the function of the data learner 1210 illustrated in FIG. 13. The model learner 1510-4 of the server 1500 may learn a reference on which data for the message to use to determine a predetermined situation and on how to determine the situation using the data for the message. The model learner 1510-4 may learn a reference for determination for the importance of the message by obtaining the data for the message to be used for the learning and applying the obtained data to the data analysis model to be described below.

Further, the analysis result provider 1220-4 of the electronic apparatus 100 may determine the importance of the message by applying the data selected by the analysis data selector 1220-3 to the data analysis model generated by the server 1500. For example, the analysis result provider 1220-4 may transmit the data for the message selected by the analysis data selector 1220-3 to the server 1500, and request the server 1500 to determine the importance of the message by applying the data selected by the analysis data selector 1220-3 to the data analysis model. Further, the analysis result provider 1220-4 may receive information on the importance of the message determined by the server 1500 from the server 1500. For example, when the analysis data selector 1220-3 transmits the data for the message to the server 1500, the server 1500 may transmit the information on the importance of the message to the electronic apparatus 100 by applying the data for the message to the prestored data analysis model to determine the importance of the message.

The analysis result provider 1220-4 of the electronic apparatus 100 may receive the analysis model generated by the server 1500 from the server 1500, and may determine the situation using the received analysis model. In this case, the analysis result provider 1220-4 of the electronic apparatus 100 may determine the importance of the message by applying the data for the message selected by the analysis data selector 1220-3 to the data analysis model received from the server 1500.

Figure 16:
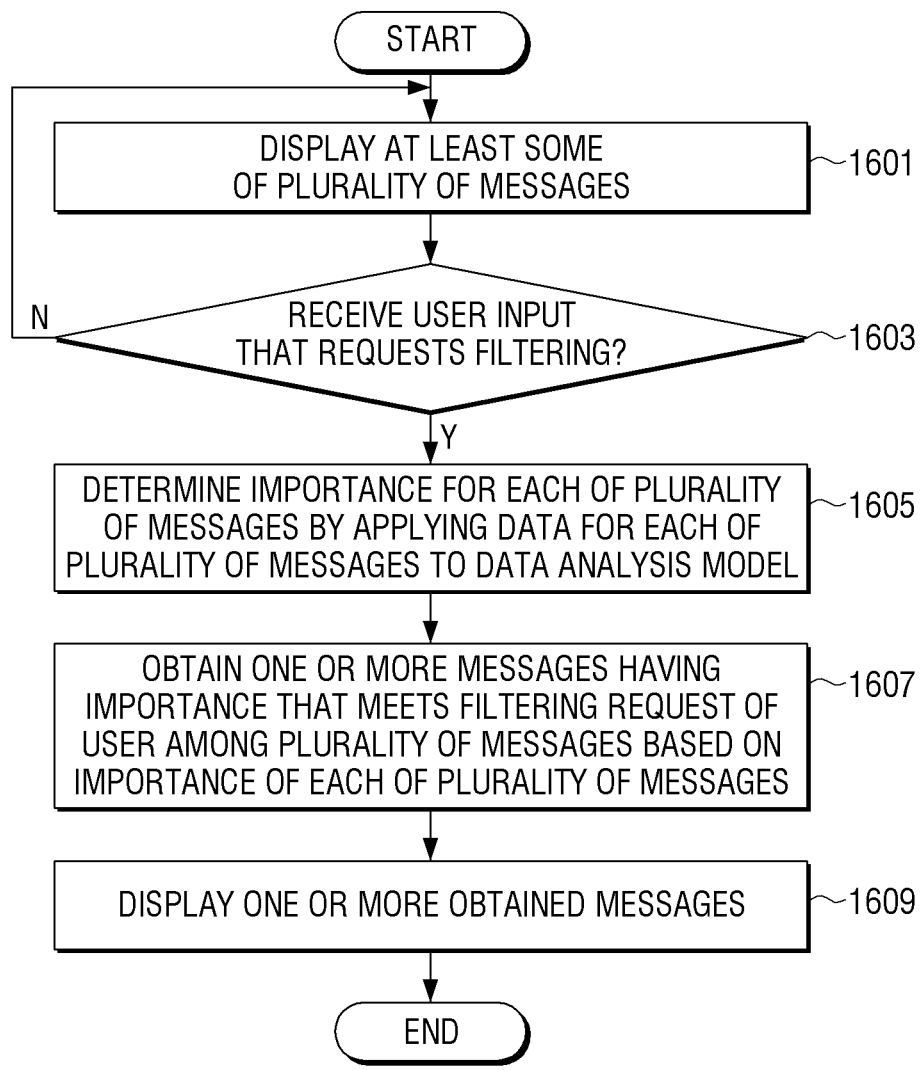
FIG. 16 is a flowchart illustrating an example operation of an electronic apparatus using a data analysis model according to various example embodiments of the present disclosure.

FIG. 16 is a flowchart illustrating an example operation of the electronic apparatus 100 using the data analysis model according to various example embodiments.

The electronic apparatus 100 may display at least some of the plurality of messages (1601).

The electronic apparatus 100 may determine whether or not a user input that requests the filtering of the plurality of messages is received (1603).

If the user input is received (Yes in 1603), the electronic apparatus 100 may determine the importance of each of the plurality of messages by applying the data for each of the plurality of messages to the data analysis model (1605). The data analysis model may be stored in the memory 240 of the electronic apparatus 100. Here, the memory 240 may include a memory provided in the electronic apparatus 100 or a memory card mounted in the electronic apparatus 100. Further, the data for the message may include, for example, at least one of a text, an image, a moving image, and an audio which are included in the message. Further, the data for the message may also be the preprocessed or selected data. For example, the data for the message may be the data for which the preprocessing is performed in the preprocessor 310 of FIG. 3.

The electronic apparatus 100 may obtain one or more messages having importance that meets the filtering request of the user, from among the plurality of messages, based on the determined importance of each of the plurality of messages (1607).

The electronic apparatus 100 may display the one or more obtained messages on the screen (1609).

According to various example embodiments, the electronic apparatus 100 may also previously determine the importance for each of the plurality of messages by previously applying the data for each of the plurality of messages to the data analysis model, prior to receiving the user input that requests the filtering. For example, the electronic apparatus 100 may be in a state in which it previously determines the importance for each of the plurality of messages using the data analysis model stored in the memory 240 prior to performing the operation (1601) or performing the operation (1603).

In this case, if the user input that requests the filtering is received, the electronic apparatus 100 may obtain one or more messages having importance that meets the filtering request of the user, among the plurality of messages, based on the predetermined importance of each of the plurality of messages and display the obtained messages on the screen.

Figure 17:
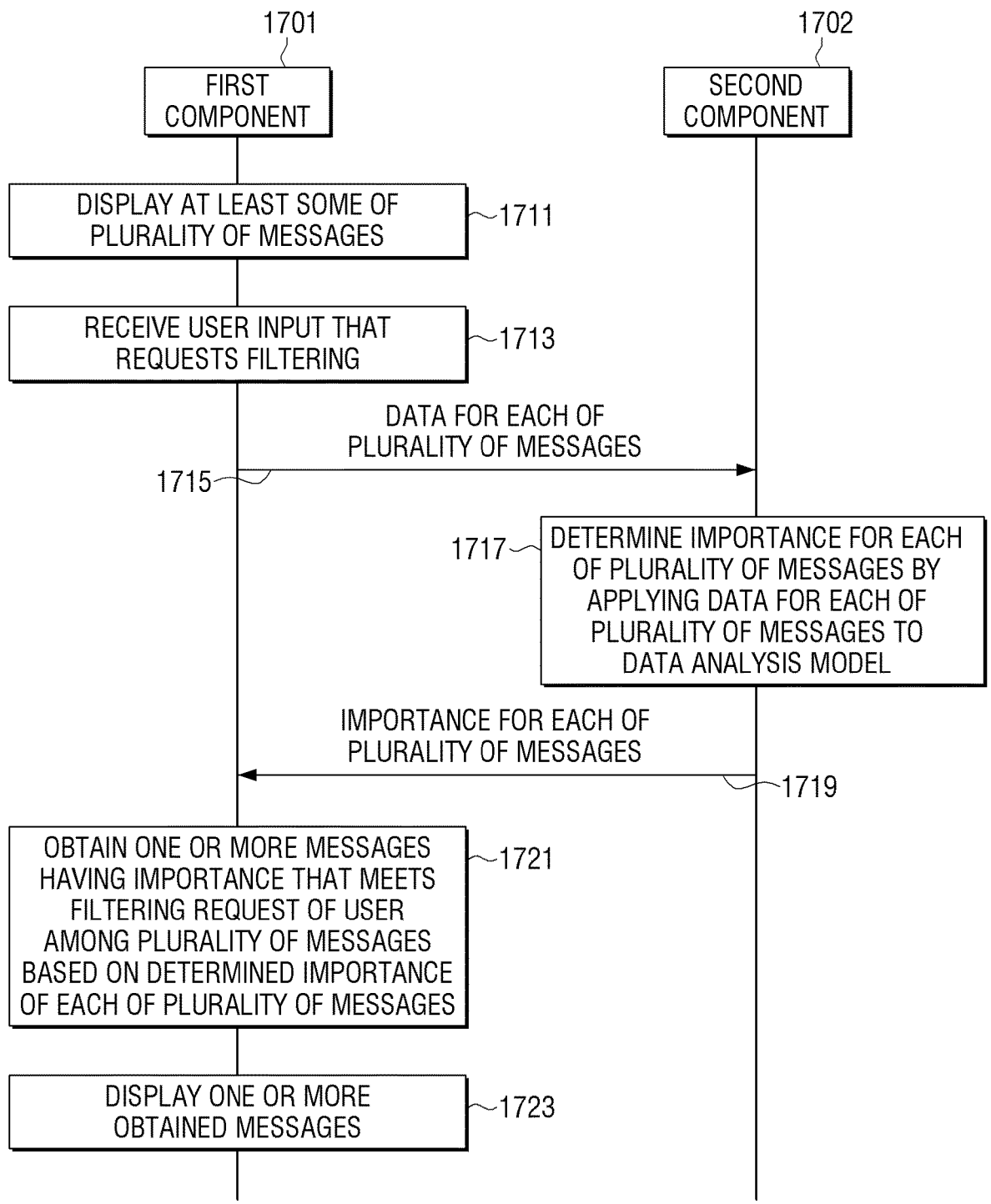
FIGS. 17 and 18 are flowcharts illustrating an example network system using a data analysis model according to various example embodiments of the present disclosure.
Figure 18:
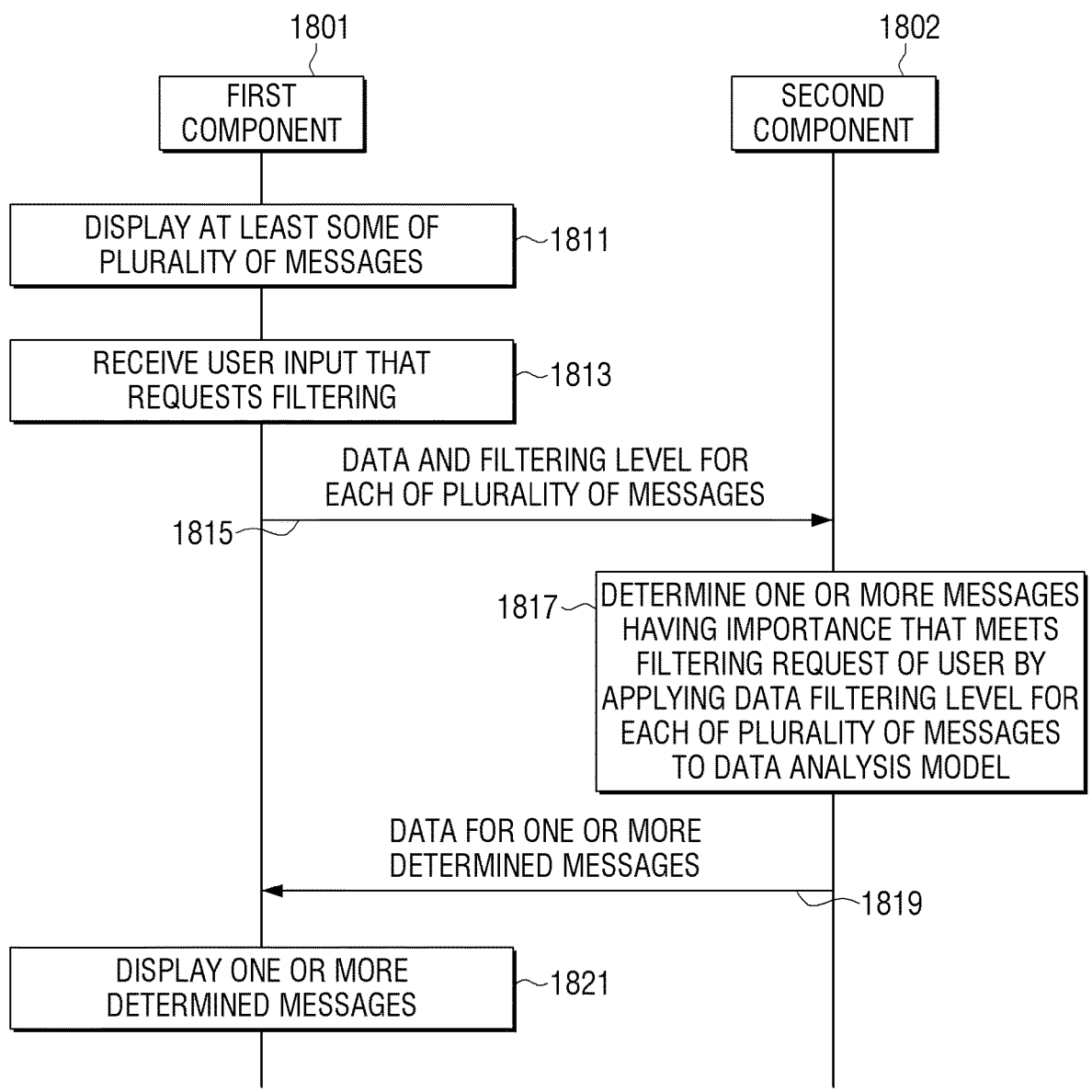

FIGS. 17 and 18 are flowcharts illustrating an operation of an example network system using a data analysis model according to various example embodiments.

In FIGS. 17 and 18, the network system using the data analysis model may include a first component 1701, 1801, and a second component 1702, 1802.

Here, the first component 1701, 1801 may be the electronic apparatus 100, and the second component 1702, 1802 may be the server 1500 in which the data analysis model is stored. The first component 1701, 1801 may be the general-purpose processor, and the second component 1702, 1802 may be the AI dedicated processor. The first component 1701, 1801 may be at least one application, and the second component 1702, 1802 may be the operating system (OS). For example, the second component 1702, 1802 is a component that is more integrated or dedicated, or less delayed, or has dominant performance or more resource than the first component 1701, 1801, and may be a component that may process many operations required to generate, update, or apply the data recognition model faster and more efficiently than the first component 1701 and 1801.

In this case, an interface for transmitting/receiving the data between the first component 1701 and the second component 1702 may be defined.

For example, an application program interface (API) having the learning data to be applied to the data recognition model as a factor value (or a parameter value or a transfer value) may be defined. The API may be defined as a set of subroutines or functions that may be called for any processing of another protocol (e.g., a protocol defined in the sever 1500) in any one protocol (e.g., a protocol defined in the electronic apparatus 100). That is, an environment in which an operation of another protocol may be performed in any one protocol through the API may be provided.

According to an example embodiment, in FIG. 17, the first component 1701 may display at least some of the plurality of messages (1711).

In this situation, the electronic apparatus 100 may receive a user input that requests the filtering of the plurality of messages (1713).

If the user input is received, the first component 1701 may transmit the data for each of the plurality of messages to the second component 1702 (1715).

The second component 1702 may determine the importance of each of the plurality of messages by applying the received data for each of the plurality of messages to the data analysis model of the second component 1702 (1717).

The second component 1702 may transmit the determined importance of each of the plurality of messages to the first component 1701 (1719).

The first component 1701 may obtain one or more messages having importance that meets the filtering request of the user, from among the plurality of messages, based on the received importance of each of the plurality of messages (1721).

The first component 1701 may display the one or more obtained messages on the screen (1723).

According to various example embodiments, the first component 1701 may also previously determine the importance for each of the plurality of messages by previously applying the data for each of the plurality of messages to the data analysis model of the second component 1702, prior to receiving the user input that requests the filtering. For example, the first component 1701 may transmit the data for each of the plurality of messages to the second component 1702 prior to performing the operation (1711) or performing the operation (1713), and receive and store the importance for each of the plurality of messages in response.

In this case, if the user input that requests the filtering is received, the first component 1701 may obtain one or more messages having importance that meets the filtering request of the user, among the plurality of messages, based on the predetermined importance of each of the plurality of messages and display the obtained messages on the screen.

According to another example embodiment, in FIG. 18, the first component 1801 may display at least some of the plurality of messages (1811).

In this situation, the first component 1801 may receive a user input that requests the filtering of the plurality of messages (1813).

If the user input is received, the first component 1801 may transmit the data and filtering level (or filtering condition) for each of the plurality of messages to the second component 1802 (1815). The filtering level may be, for example, information which is previously stored by the user, a manufacturer of the electronic apparatus 100, or a manufacturer of an application performing an operation according to the present disclosure, or a developer. As illustrated in FIGS. 5A and 5B, the filtering level may be information corresponding to the position of the indicator 501b according to the operation of the user.

The second component 1802 may determine one or more messages having the importance that meets the filtering request of the user by applying the received data and filtering level for each of the plurality of messages to the data analysis model of the second component 1802 (1817).

The second component 1802 may transmit the determined data for one or more messages to the first component 1801 (1819). Here, the data for the message may be, for example, the determined message itself or identification information of the message.

The second component 1802 may display a message corresponding to the data for the determined message on the screen as a response for the user input of the operation (1813) (1821).

Names of the components of the device 100 described above may be changed. Further, the device 100 according to the present disclosure may be configured to include one or more of the components described above, and may omit some components or may further include other components.

The various example embodiments of the present disclosure may also be implemented in a form of a recording medium including instructions which may be executed by a computer such as a program module executed by the computer. The computer readable medium may be any available medium which may be accessed by the computer and includes both volatile and non-volatile media, and removable and non-removable media. Further, the computer readable medium may include both a computer storage medium and a communication medium. The computer storage medium includes both volatile and non-volatile media, and removable and non-removable media which are implemented by any method or technology for storing information such as computer readable instructions, data structures, program modules, or other data. The communication medium includes other data of modulated data signals such as computer readable instructions, data structures, program modules, or carriers, or other transmission mechanisms, and includes any information transfer medium.

Further, at least some of the apparatuses (e.g., the modules or the functions thereof) or the methods according to various example embodiments may be implemented in a form of the program module by instructions stored in a non-transitory computer readable medium. Here, the program may be stored in the non-transitory computer readable medium and read and executed by the computer to implement the example embodiment of the present disclosure. The non-transitory computer readable medium may refer, for example, to a medium that stores semi-permanently data and is capable of being read by a device, and includes registers, caches, buffers, and the like.

Further, the method according to the disclosed example embodiments may be provided as a computer program product.

The computer program product may include software (S/W) program, a computer readable medium in which the S/W program is stored, or products traded between the seller and the buyer.

For example, the computer program product may include a product (e.g., a downloadable app) of an S/W program form which is electronically distributed through the electronic apparatus or a manufacturer of the electronic apparatus or an electronic market (e.g., Google play store, App store). For the electronic distribution, at least a portion of the S/W program may be stored in the storage medium, or temporarily generated. In this case, the storage medium may be a storage medium of a manufacturer or a server of an electronic market or a relay server.

It is to be understood that the foregoing description of the present disclosure is intended to be illustrative, and that those skilled in the art will readily appreciate that other embodiments are possible without departing from the spirit or essential characteristics of the present disclosure. Therefore, it should be understood that the example embodiments described above are not restrictive, but are examples in all aspects. For example, each component described as a single form may be distributed and implemented, and components described as being distributed may also be implemented in a combined form.

It should be understood that the scope of the present disclosure is defined by the following claims and their equivalents rather than the above-mentioned detailed description and all modifications or alterations deduced from the meaning, the scope, and equivalences of the claims are included in the scope of the present disclosure.

What is claimed is:

1. A method of filtering a plurality of messages of an electronic apparatus, the method comprising:
    displaying the plurality of messages and a user interface, the user interface comprising a filtering bar and an indicator positioned on the filtering bar, wherein a position of the indicator on the filtering bar is indicative of a filtering level;
    based on an input for moving the indicator on the filtering bar being received, identifying a filtering level corresponding to a position of the moved indicator on the filtering bar;
    identifying an importance level for the plurality of messages, wherein the importance level for a respective message is identified based on at least a number of the plurality of messages, an occurrence frequency number of a specific word included in the plurality of messages, an occurrence frequency number of the specific word included in the respective message, a number of messages including a specific word from among the plurality of messages, and a time when the respective message is generated;
    obtaining at least one message from among the plurality of messages based on a number of messages selected according to the identified filtering level and a ranking information of the plurality of messages according to the importance level of the plurality of messages; and
    displaying the at least one obtained message.

2. The method as claimed in claim 1, wherein the plurality of messages comprise one or more of all messages included in a chatting room in which a user has communicated with a third party, all comments about specific contents, and all emails stored in an email box.

3. The method as claimed in claim 1, further comprising: displaying a plurality of buttons corresponding to the plurality of filtering levels,
    wherein the input comprises an input for selecting one button of the plurality of buttons, and
    wherein the obtaining comprises filtering at least one message having an importance level that meets a filtering level corresponding to the selected one button from among the plurality of messages based on the importance level for the plurality of messages.

4. The method as claimed in claim 1, wherein the obtaining comprises calculating a message score of the plurality of messages.

5. The method as claimed in claim 4, wherein the calculating comprises calculating the message score based on at least one of: a number of the plurality of messages, a weight value for each of types of the specific word included in the plurality of messages, and a provision time of the plurality of messages.

6. The method as claimed in claim 4, wherein the obtaining comprises determining the importance level for the plurality of messages based on the calculating of the message score of the plurality of messages.

7. The method as claimed in claim 6, wherein the determining comprises determining the importance level for the plurality of messages based on at least one of the ranking information of the plurality of messages, and a percentile of the score or the ranking.

8. An electronic apparatus configured to filter a plurality of messages, the electronic apparatus comprising:
    a display;
    an input unit comprising input circuitry; and
    a processor configured to:
    control the display to display the plurality of messages and a user interface, the user interface comprising a filtering bar and an indicator positioned on the filtering bar, wherein the indicator position on the filtering bar is indicative of a filtering level,
    based on an input for moving the indicator on the filtering bar being received through the input unit, identify a filtering level corresponding to a position of the moved indicator on the filtering bar, identify an importance level for the plurality of messages, wherein the importance level for a respective message is identified based on at least a number of the plurality of messages, an occurrence frequency number of a specific word included in the plurality of messages, an occurrence frequency number of the specific word included in the respective message, a number of messages including a specific word from among the plurality of messages, and a time when the respective message is generated, obtain at least one message from among the plurality of messages based on a number of messages selected according to the identified filtering level and a ranking information of the plurality of messages according to the importance level of the plurality of messages, and control the display to display the at least one obtained message.

9. The electronic apparatus as claimed in claim 8, wherein the plurality of messages comprises one or more of all messages included in a chatting room in which the user has communicated with a third party, all comments about specific contents, or all emails stored in an email inbox.

10. The electronic apparatus as claimed in claim 8, wherein the display is configured to display a plurality of buttons corresponding to the plurality of filtering levels,
wherein the input for selecting the filtering level comprises an input for selecting one button of the plurality of buttons, and
wherein the processor is configured to obtain at least one message having an importance level that meets a filtering level corresponding to the selected one button from among the plurality of messages based on the importance level for the plurality of messages.

11. The electronic apparatus as claimed in claim 8, wherein the processor is configured to calculate a message score of the plurality of messages.

12. The electronic apparatus as claimed in claim 11, wherein the processor is configured to calculate the message score based on at least one of a number of the plurality of messages, a weight value for each of types of the specific word included in the plurality of messages, and a provision time of the plurality of messages.

13. The electronic apparatus as claimed in claim 11, wherein the processor is configured to determine the importance level for the plurality of messages based on the calculating of the message score of the plurality of messages.

14. The electronic apparatus as claimed in claim 13, wherein the processor is configured to determine the importance level for the plurality of messages based on at least one of the ranking information of the plurality of messages, and a percentile of the score or the ranking.

15. The electronic apparatus as claimed in claim 8, wherein the plurality of messages is associated with a different user.

16. The electronic apparatus as claimed in claim 8, wherein content including moving images is displayed simultaneously with the plurality of messages.

17. The electronic apparatus as claimed in claim 8, wherein content is displayed simultaneously with the plurality of messages and the content includes a message posted by a user of the electronic apparatus to a social network service.

\* \* \* \* \*